United States Patent
Dohi et al.

(10) Patent No.: US 10,120,623 B2
(45) Date of Patent: Nov. 6, 2018

(54) IMAGE FORMING APPARATUS ENABLING CHARGING MANAGEMENT, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Makoto Dohi, Naka-gun (JP); Kazuhiro Sugawara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/822,735

(22) Filed: Nov. 27, 2017

(65) Prior Publication Data

US 2018/0081606 A1   Mar. 22, 2018

Related U.S. Application Data

(63) Continuation of application No. 15/281,532, filed on Sep. 30, 2016, now Pat. No. 9,851,932, which is a
(Continued)

(30) Foreign Application Priority Data

Jan. 22, 2014 (JP) .................................. 2014-009397

(51) Int. Cl.
*G06F 3/12* (2006.01)
*G06Q 30/04* (2012.01)
(Continued)

(52) U.S. Cl.
CPC .......... *G06F 3/1238* (2013.01); *G06F 3/1222* (2013.01); *G06F 3/1267* (2013.01);
(Continued)

(58) Field of Classification Search
USPC ........................................................ 358/1.15
See application file for complete search history.

(56) References Cited

U.S. PATENT DOCUMENTS

2003/0197885 A1   10/2003   Takeo
2008/0094657 A1*   4/2008   Ikegami ................ G06F 21/608
                                                     358/1.15
(Continued)

FOREIGN PATENT DOCUMENTS

JP          2003316458 A     11/2003

OTHER PUBLICATIONS

Office Action issued in U.S. Appl. No. 14/598,730, dated Oct. 2, 2015.
(Continued)

*Primary Examiner* — Ngon Nguyen
(74) *Attorney, Agent, or Firm* — Rossi, Kimms & McDowell LLP

(57) ABSTRACT

An image forming apparatus that is capable of flexibly coping with charging in various protocols. A user information storage unit allows registering relating user information related with a protocol. A reception unit receives a print job that includes the relating user information and that is requested to execute according to a protocol from an external apparatus. A determination unit determines whether the relating user information in the print job is registered in the user information storage unit. A storing unit stores the print job without starting to print when the determination unit determines that the relating user information included in the print job is not registered. A registration unit registers the relating user information included in the print job to the user information storage unit, when printing of the print job stored is started according to an instruction from a user who logged in to the image forming apparatus.

10 Claims, 21 Drawing Sheets

Related U.S. Application Data continuation of application No. 14/598,730, filed on Jan. 16, 2015, now Pat. No. 9,477,433.

(51) Int. Cl.
  *G06K 15/00* (2006.01)
  *H04L 29/06* (2006.01)

(52) U.S. Cl.
  CPC ......... *G06F 3/1292* (2013.01); *G06K 15/005* (2013.01); *G06K 15/4095* (2013.01); *G06Q 30/04* (2013.01); *H04L 63/08* (2013.01); *H05K 999/00* (2013.01)

(56) References Cited

U.S. PATENT DOCUMENTS

| | | | | |
|---|---|---|---|---|
| 2008/0126392 | A1* | 5/2008 | Chrisop | G06F 3/1204 |
| 2011/0026079 | A1* | 2/2011 | Nakagawa | G06F 3/1204 |
| | | | | 358/1.15 |
| 2012/0212757 | A1* | 8/2012 | Gaertner | G06F 3/1206 |
| | | | | 358/1.13 |
| 2012/0212773 | A1* | 8/2012 | Ciocarlie | G06F 3/1205 |
| | | | | 358/1.15 |
| 2013/0016388 | A1* | 1/2013 | Amano | G06F 3/1204 |
| | | | | 358/1.14 |

OTHER PUBLICATIONS

Office Action issued in U.S. Appl. No. 14/598,730, dated Mar. 15, 2016.
Notice of Allowance issued in U.S. Appl. No. 14/598,730, dated Jun. 29, 2016.
Office Action issued in U.S. Appl. No. 15/281,532 dated Nov. 18, 2016.
Notice of Allowance issued in U.S. Appl. No. 15/281,532 dated Aug. 29, 2017.
Notice of Allowance issued in U.S. Appl. No. 15/281,532 dated May 8, 2017.

* cited by examiner

| USER ID | PROTOCOL INFORMATION ID | RELATING USER INFORMATION | CHARGING INFORMATION ||
|---|---|---|---|---|
| | | | FIRST CHARGING INFORMATION | SECOND CHARGING INFORMATION |
| USER A | 1 | user A | 200 | 1010 |
| | 2 | user A@canon.co.jp | 300 | |
| | 3 | user A@xxx.com | 400 | |
| | 4 | user A@yyy.com | 100 | |
| | 5 | AAA | 10 | |
| USER B | 1 | user B | 200 | 520 |
| | 2 | | | |
| | 3 | | | |
| | 4 | user B@yyy.com | 300 | |
| | 5 | BBB | 20 | |
| USER C | 1 | user C | 100 | 310 |
| | 2 | user C@canon.co.jp | 200 | |
| | 3 | | | |
| | 4 | | | |
| | 5 | CCC | 10 | |
| USER D | 1 | user D | 150 | 180 |
| | 2 | | | |
| | 3 | | | |
| | 4 | | | |
| | 5 | DDD | 30 | |

| PROTOCOL INFORMATION ID | PROTOCOL INFORMATION |
|---|---|
| 1 | LPR - Job Ticket Type A |
| 2 | WSD - Job Ticket Type B |
| 3 | HTTP - Job Ticket Type A |
| 4 | IPP - Job Ticket Type B |
| 5 | LPR - Job Ticket Type A |
| ・・・ | ・・・ - Job Ticket Type x |

*FIG. 14*

| USER ID | PROTOCOL INFORMATION ID | CHARGING INFORMATION ||
|---|---|---|---|
| | | FIRST CHARGING INFORMATION | SECOND CHARGING INFORMATION |
| USER A | 1 | 200 | 1010 |
| | 2 | 300 | |
| | 3 | 400 | |
| | 4 | 100 | |
| | 5 | 10 | |
| USER B | 1 | 200 | 520 |
| | 2 | | |
| | 3 | | |
| | 4 | 300 | |
| | 5 | 20 | |
| USER C | 1 | 100 | 310 |
| | 2 | 200 | |
| | 3 | | |
| | 4 | | |
| | 5 | 10 | |
| USER D | 1 | 150 | 180 |
| | 2 | | |
| | 3 | | |
| | 4 | | |
| | 5 | 30 | |

1400

IMAGE FORMING APPARATUS ENABLING CHARGING MANAGEMENT, CONTROL METHOD THEREFOR, AND STORAGE MEDIUM STORING CONTROL PROGRAM THEREFOR

BACKGROUND OF THE INVENTION

Field of the Invention

The present invention relates to an image forming apparatus that enables charging management, a control method therefor, and a storage medium storing a control program therefor.

Description of the Related Art

Conventionally, there is a known system that issues a job ticket using a server and charges a user listed in the job ticket, as a system for authenticating a user and charging to the user when printed (for example, see Japanese Laid-Open Patent Publication (Kokai) No. 2003-316458 (JP 2003-316458A)).

In this case, it is necessary to request issue of a job ticket from a server, to permit issue of a job from a server, and to prepare a conversion table of a user ID and a charging destination account for the check to a server.

Moreover, there are the various print methods, such as a local print from a smart phone, and a tablet terminal and a cloud print connecting to a cloud server, in recent years. On the other hand, an image forming apparatus that prints supports protocols of those print methods.

When a format of user information used in a print protocol or a format of a job ticket is not supported by an image forming apparatus, the image forming apparatus may not authenticate and charge, in the system that supports a plurality of print protocols and charges when a user is authenticated and prints.

When there is a print protocol that can support neither authentication nor charging in this way, the image forming apparatus prohibits execution of all jobs including jobs with supported print protocols, or treats a job with an unsupported protocol as an undefined user's job.

SUMMARY OF THE INVENTION

The present invention provides an image forming apparatus, a control method therefor, and a storage medium storing a control program therefor, which are capable of flexibly coping with charging in various print protocols.

Accordingly, a first aspect of the present invention provides an image forming apparatus comprising a user information storage unit configured to store relating user information related with a protocol, a reception unit configured to receive a print job that includes relating user information and that is requested to execute according to a specific protocol from an external apparatus, a determination unit configured to determine whether the relating user information included in the print job received by the reception unit is stored in the user information storage unit as the relating user information related with the specific protocol, a storing unit configured to store the print job without starting to print in a case where the determination unit determines that the relating user information included in the print job is not stored in the user information storage unit as the relating user information related with the specific protocol, and a registration unit configured to register the relating user information included in the print job to the user information storage unit as the relating user information related with the specific protocol, in a case where printing of the print job stored by the storing unit is started according to an instruction from a user who logged in to the image forming apparatus.

Accordingly, a second aspect of the present invention provides a control method for an image forming apparatus comprising a reception step of receiving a print job that includes relating user information and that is requested to execute according to a specific protocol from an external apparatus, a determination step of determining whether the relating user information included in the print job received in the reception step is stored in a user information storage unit as the relating user information related with the specific protocol, a storing step of storing the print job without starting to print in a case where it is determined that the relating user information included in the print job is not stored in the user information storage unit as the relating user information related with the specific protocol in the determination step, and a registration step of registering the relating user information included in the print job to the user information storage unit as the relating user information related with the specific protocol, in a case where printing of the print job stored in the storing step is started according to an instruction from a user who logged in to the image forming apparatus.

Accordingly, a third aspect of the present invention provides a non-transitory computer-readable storage medium storing a control program causing a computer to execute the control method of the second aspect.

The present invention enables to flexibly cope with charging in various print protocols.

Further features of the present invention will become apparent from the following description of exemplary embodiments with reference to the attached drawings.

BRIEF DESCRIPTION OF THE DRAWINGS

FIG. 4A is a view showing a user information table, and FIG. 4B is a view showing a protocol information table.

FIG. 14 is a view showing a user information table of an image forming apparatus according to a second embodiment of the present invention.

DESCRIPTION OF THE EMBODIMENTS

Hereafter, embodiments according to the present invention will be described in detail with reference to the drawings.

Figure 1:
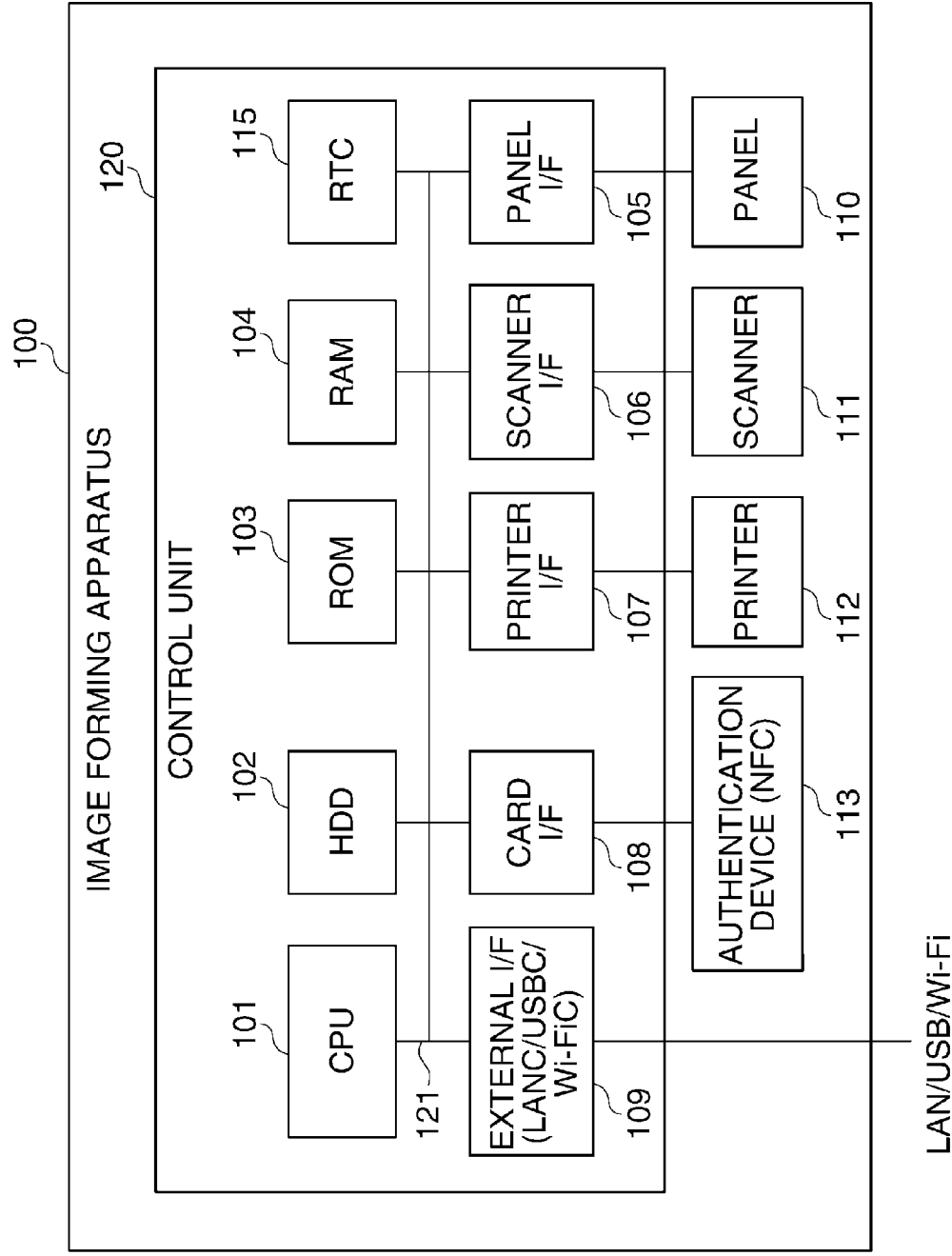
FIG. 1 is a block diagram schematically showing a hardware configuration of an image forming apparatus according to a first embodiment of the present invention.

FIG. 1 is a block diagram schematically showing a hardware configuration of an image forming apparatus 100 according to a first embodiment of the present invention.

As shown in FIG. 1, the image forming apparatus 100 consists of a control unit 120, a panel 110, a scanner 111 printer 112, and an authentication device 113.

The control unit 120 controls the whole image processing apparatus 100. The panel 110 receives an operational input by a user, and displays variety of information to a user. The scanner 111 reads an original optically and generates image data that shows the original.

The printer 112 prints an image shown by image data to a recording media, such as a paper sheet. The authentication device 113 is used for user authentication by communicating with an IC card or a portable terminal that has an NFC (Near Field Communication) function with NFC.

Next, configuration of the control unit 120 will be described. The control unit 120 consists of a CPU 101, an HDD 102, a ROM 103, a RAM 104, an RTC 115, an external interface (I/F) 109, a card interface 108, a printer interface 107, a scanner interface 106, and a panel interface 105, which are connected via a system bus 121.

The CPU 101 controls the entire image forming apparatus 100 by controlling the control unit 120. The HDD 102 stores various programs and various data such as image data. The ROM 103 stores various programs, such as a boot program, and various data, such as a setting value.

The RAM 104 is used as a work area of the CPU 101, and stores various programs and various data. The RTC 115 provides the date and the current time, and is used for measuring time etc.

The panel interface 105 is an interface between the panel 110 and the control unit 120. The scanner interface 106 is an interface between the scanner 111 and the control unit 120. The printer interface 107 is an interface between the printer 112 and the control unit 120. The card interface 108 is an interface between the authentication device 113 and the control unit 120.

The external interface 109 includes a LAN controller (LANC), a USB controller (USBC), a Wi-Fi controller (Wi-FiC), etc. for connecting with an external device. The image forming apparatus 100 is requested from the external device (a host device) 109 so as to execute a print job according to a print protocol of the external device.

Figure 2:
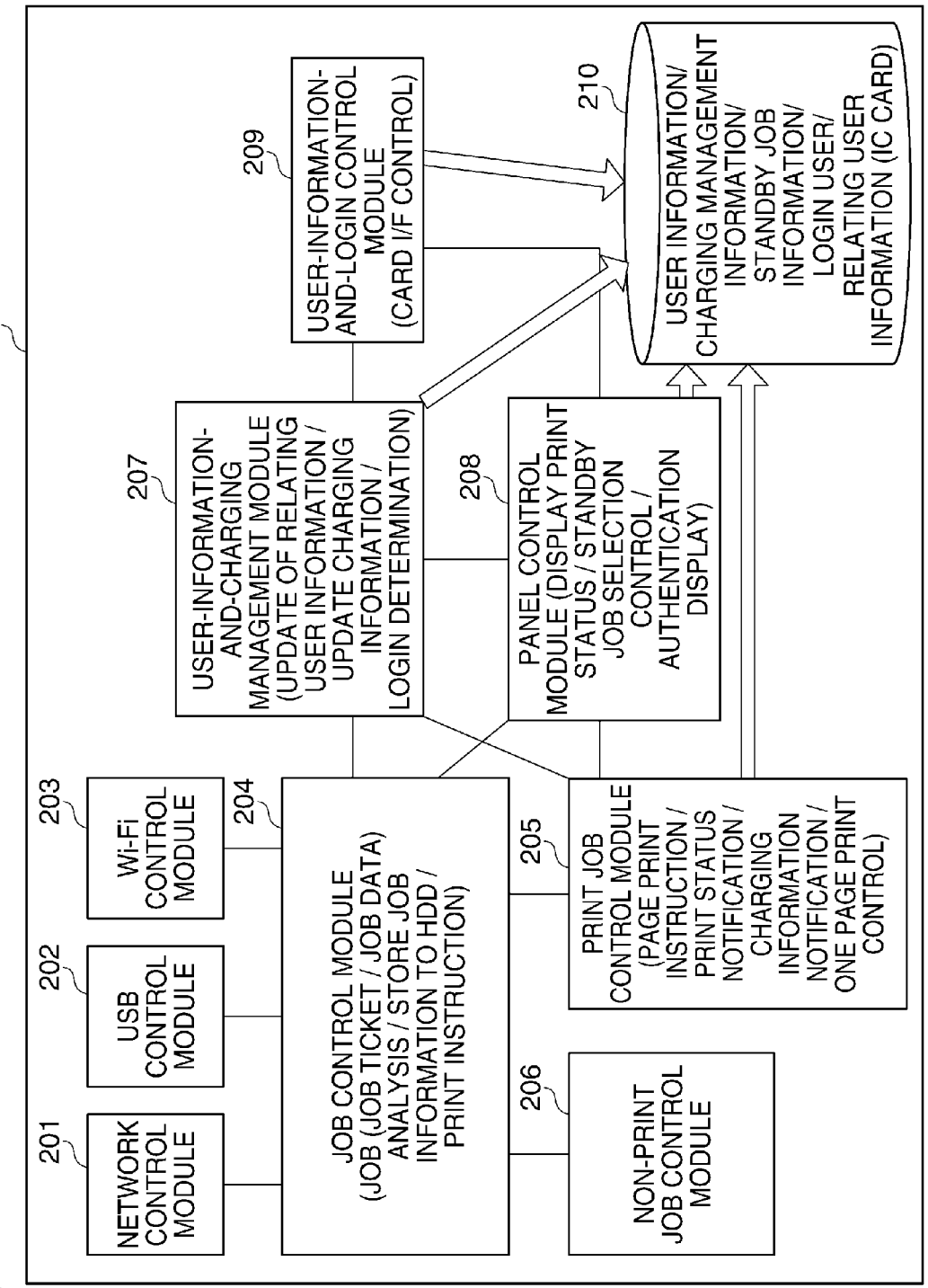
FIG. 2 is a block diagram schematically showing a software configuration of the image forming apparatus shown in FIG. 1.

FIG. 2 is a block diagram schematically showing a software configuration of the image forming apparatus 100 shown in FIG. 1.

As shown in FIG. 2, the software of the image forming apparatus 100 consists of a network control module 201, a USB control module 202, a Wi-Fi control module 203, a job control module 204, a print job control module 205, a non-print job control module 206, a user-information-and-charging management module 207, a panel control module 208, and a user-information-and-login control module 209. The software is executed by the CPU 101. Moreover, variety of information 210 stored in the HDD 102 is also shown in FIG. 2.

The network control module 201 controls a LAN controller of the external interface 109 and receives job information for executing a print job from a client PC or a server connected to the network.

The USB control module 202 controls a USB controller of the external interface 109 and receives job information from a client PC or a server connected to the network.

The Wi-Fi control module 203 controls a Wi-Fi controller of the external interface 109 and receives job information from a client PC or a server via a wireless network.

The network control module 201, the USB control module 202, and the Wi-Fi control module 203 mentioned above support various protocols, such as HTTP, IPP, LRP, RAW, and WSD.

The job control module 204 stores job information received by the network control module 201, the USB control module 202, and the Wi-Fi control module 203 via a network, USB, and Wi-Fi, respectively, to the RAM 104.

Moreover, the job control module 204 instructs the print job control module 205 to print when the received job information is print job information for executing a print job and allows charging. On the other hand, when it does not allow charging, the job control module 204 stores the job information to the HDD 102.

Furthermore, the job control module 204 instructs the non-print job control module 206 to execute a process, when the job information is non-print job information, such as scan job information or transmission job information.

The print job control module 205 prints the print job data included in the print job information analyzed by the job control module 204, and notifies the printing controlling status in the printer 112 received from the printer interface 107 to the panel control unit 208.

Moreover, the print job control module 205 notifies the user-information-and-charging management module 207 of charging information for charging to a user.

The non-print job control module 206 controls a scan job, a transmission job, etc. which are non-print jobs.

The panel control module 208 controls the panel 110. Specifically, the panel control module 208 controls the panel interface 105 so that the panel displays a print status, a standby-job selection, an authentication indication at the time of login, and various indications at the time of update of relating user information.

Furthermore, the panel control module 208 receives input information inputted by the user through the panel 110, and transmits the received input information to the job control module 204.

For example, the panel control unit 208 receives a selection of print job information stored in the HDD, and a print execution instruction through the panel interface 105, and instructs the job control module 204 to control a print job.

The user-information-and-charging management module 207 stores and reads user information and charging management information that are shown in the variety of information 210. For example, when receiving an instruction for updating the relating user information mentioned below, the user-information-and-charging management module 207 updates the relating user information that is designated as the relating user information about a login user.

Moreover, the user-information-and-charging management module 207 updates the designated charging information when receiving a charging instruction. Furthermore, the user-information-and-charging management module 207 performs a login determination on the basis of the user information from the user-authentication-and-login control module and the variety of information 210, stores the login information that shows the determination result as the login user included in the variety of information 210, and transmits the determination result to the panel control module 208 and the job control module 204.

The user-authentication-and-login control module 209 controls the card interface 108, and controls reading and writing of the information on an IC card by communicating with the IC card held up over the authentication device 113.

Moreover, the relating user information among the variety of information 210 is read from an IC card.

Figure 3A:
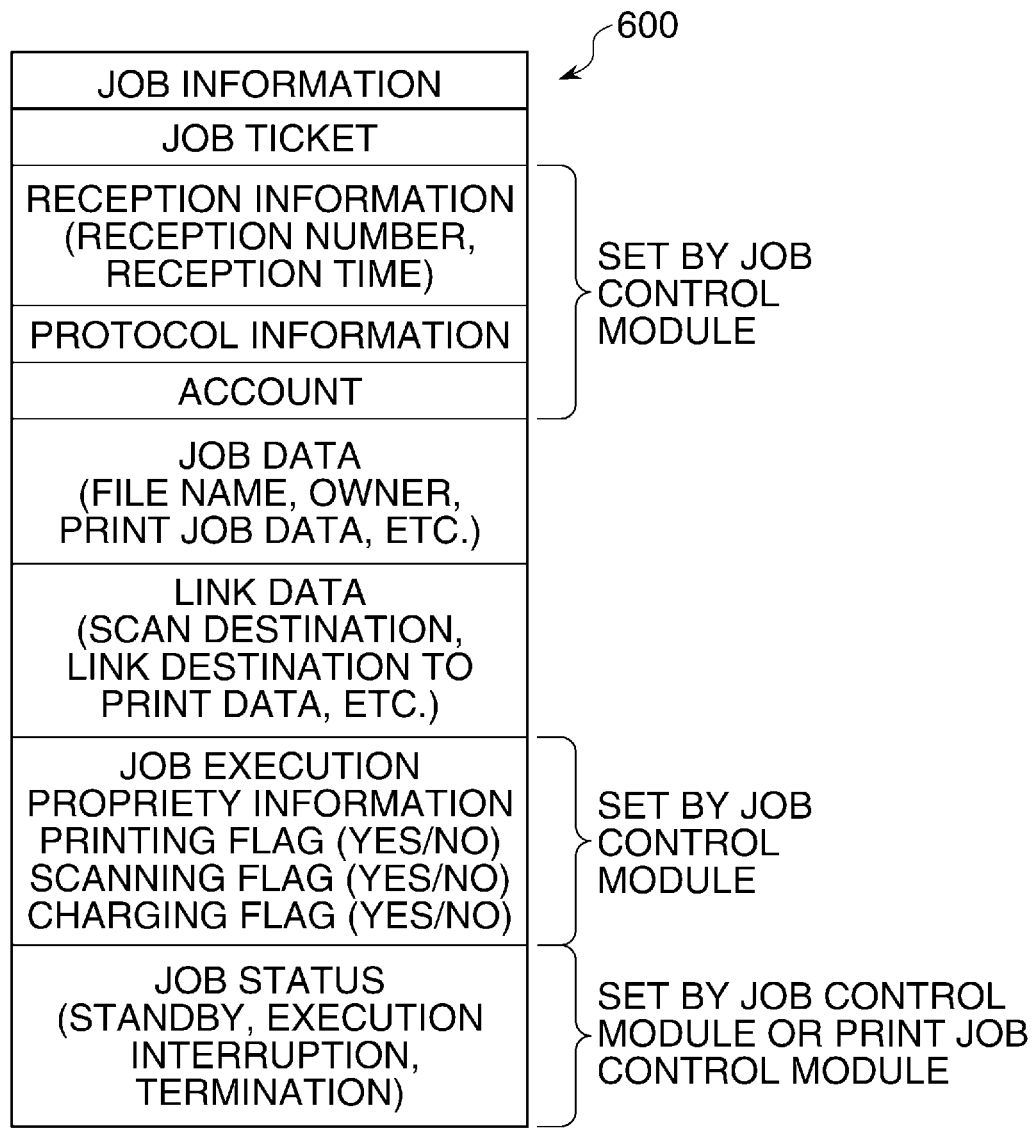
FIG. 3A is a view showing a configuration of job information.
Figure 3B:
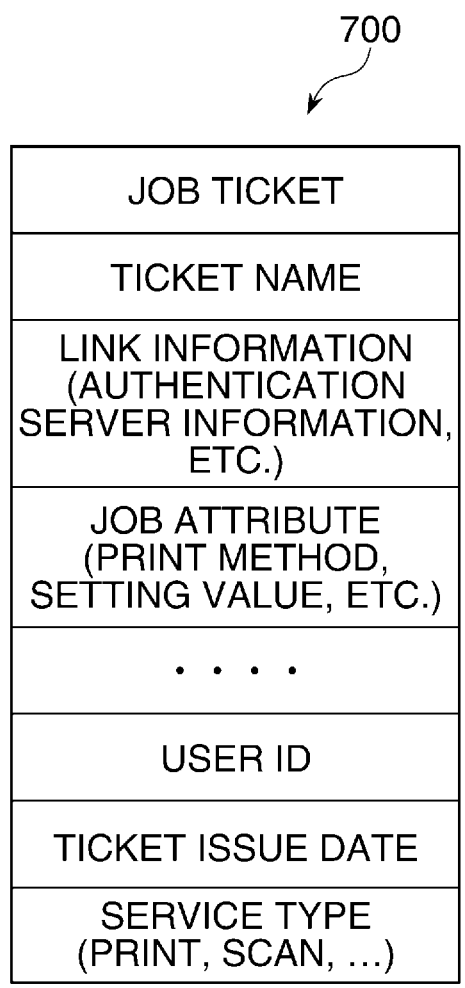
FIG. 3B is a view showing a configuration of a job ticket.

FIG. 3A is a view showing a configuration of job information 600, and FIG. 3B is a view showing a configuration of a job ticket 700.

As shown in FIG. 3A, the job information 600 consists of a job ticket, reception information, protocol information, account, job data, link data, job execution propriety information, and a job status.

The job ticket is used for charging and the configuration will be described with reference to FIG. 3B. The reception information consists of a reception number and reception time. The reception number 1 through 9999 is given when a job execution request is received. The reception number is incremented in an order of reception. The reception time is time when a job execution request is received, and is set up by obtaining time from the RTC 115.

The protocol information shows a print protocol (referred to as a "protocol", hereafter) and a job ticket type. Here, the protocol shows a communication method that is defined for each external apparatus that requests the image forming apparatus 100 to execute a print job. An external apparatus transmits the information for executing a print job according to this protocol to the image forming apparatus 100.

The job data includes a file name, an owner of a job, print job data, etc. The account is defined for each protocol about each user. A user ID for identifying a user uniquely is also one of the accounts. Thus, the job information 600 includes a combination of the protocol information and the account.

The link data shows a scan destination, a link destination of print data, etc. The job execution propriety information consists of a printing flag, a scanning flag, and a charging flag. The printing flag becomes "YES" when printing can be executed, and becomes "NO" when printing cannot be executed. The scanning flag becomes "YES" when scanning can be executed, and becomes "NO" when scanning cannot be executed. The charging flag becomes "YES" when charging can be executed, and becomes "NO" when charging cannot be executed.

The job status shows a status of a job shown by the job information concerned. Specifically, standby shows a status in which execution of a job is waited. Execution shows a status in which a job is being executed. Interruption shows a state in which execution of a job is interrupted. Termination shows a state in which execution of a job finished.

The job control module 204 sets up the reception information, the protocol information, the user ID, and the job execution propriety information in a job ticket analysis process, and the job control module 204 or the print job control module 205 sets up the job status.

As shown in FIG. 3B, the job ticket 700 consists of a ticket name, link information, a job attribute, a user ID, a ticket issue date, and a service type.

The ticket name shows a name of the job ticket 700. The link information shows authentication server information etc. The job attribute shows a print method, a setting value, etc. The user ID is the same as that in FIG. 3A.

The ticket issue date shows date and time at which this job ticket 700 was issued. The service type shows the type of the service provided by this job ticket 700, for example, is shown by a print, scan, etc.

The above-mentioned job ticket 700 is an example of a job ticket. A job ticket may include a part of the information shown in FIG. 3B, and may include other information in addition to the information shown in FIG. 3B.

FIG. 4A is a view showing a user information table 800, and FIG. 4B is a view showing a protocol information table 801. The user information table 800 and the protocol information table 801 are stored in the HDD 102 that is a storage unit.

As shown in FIG. 4A, the user information table 800 consists of a user ID (login-user information), a protocol information ID, relating user information, and charging information.

The user ID is information for specifying a user, and is stored in an IC card that communicates with the authentication device 113. Then, when the user ID stored in the IC card matches the user ID shown in the user information table 800, the user can log in to the image forming apparatus 100.

The protocol information ID is an identifier uniquely defined for each of various protocols. The relating user information is a set of user's accounts. Generally, since a user has an account for each protocol, an account is stored in combination with a protocol information ID.

The charging information consists of first charging information and second charging information. The first charging information shows a charge for each account (relating user information), and the second charging information shows the sum total.

As shown in FIG. 4B, the protocol information table 801 consists of a protocol information ID and protocol information.

The protocol information ID is an identifier for identifying various protocol information uniquely. The protocol information shows formats of a protocol and a job ticket.

In the case of FIG. 4B, for example, the protocol information ID "1" shows an LPR-job ticket type A, the protocol information ID "2" shows a WSD-job ticket type B, and the protocol information ID "3" shows an HTTP-job ticket type A.

Moreover, since there are a plurality of job ticket formats, such as an XML data format (XPS), a binary data format (PDF), and a different analysis method is needed in each job ticket format, the protocol information includes the protocol and the job ticket.

The contents shown in the user information table 800 and the protocol information table 801, which are described above, may be set up by an administrator through the panel 110, or may be set up using information obtained from another apparatus.

The user information table 800 and the protocol information table 801 are used when it is determined whether the job information 600 allows charging.

Specifically, the protocol information ID that corresponds to the protocol information included in the job information 600 is read from the protocol information table 801 in FIG. 4B. When the combination of this protocol information ID and the account included in the job information 600 is not included in the combinations of the protocol information IDs and the accounts in the relating user information shown in the user information table 800, it is determined that the job information 600 does not allow charging.

On the other hand, when the combination of this protocol information ID and the account included in the job information 600 is included in the combinations of the protocol information IDs shown in the user information table 800 and the accounts in the relating user information, it is determined that the job information 600 allows charging.

Figure 5A:
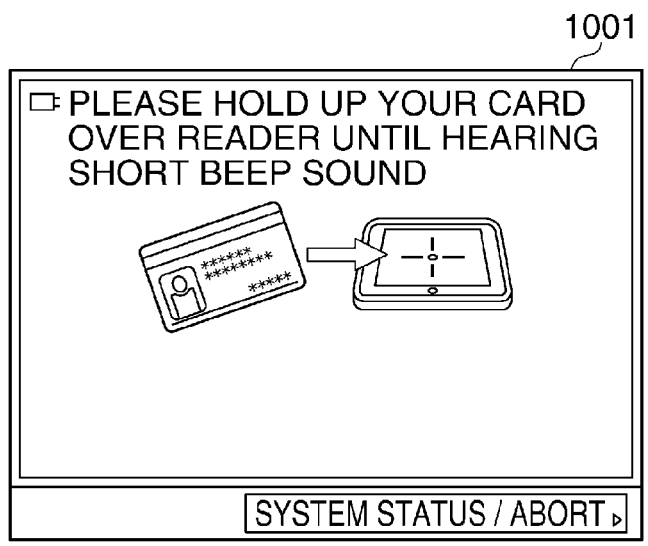
FIG. 5A, FIG. 5B, and FIG. 5C are views showing login screens (FIG. 5A and FIG. 5B) and a menu screen (FIG. 5C) that are displayed on a panel of the image forming apparatus in FIG. 1.
Figure 5B:
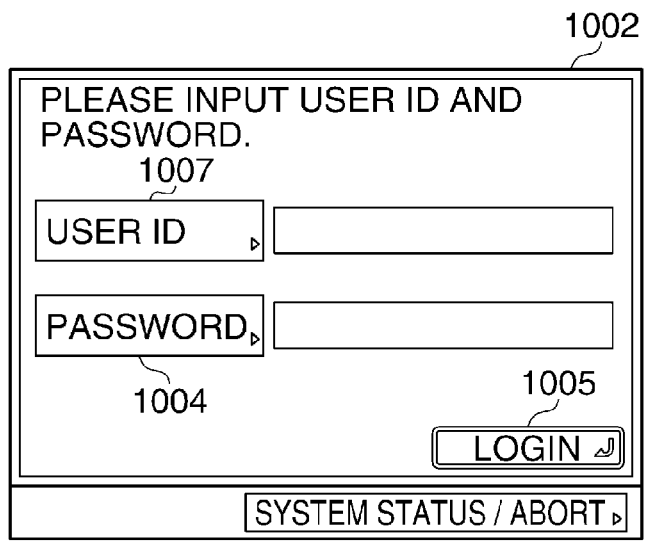
Figure 5C:
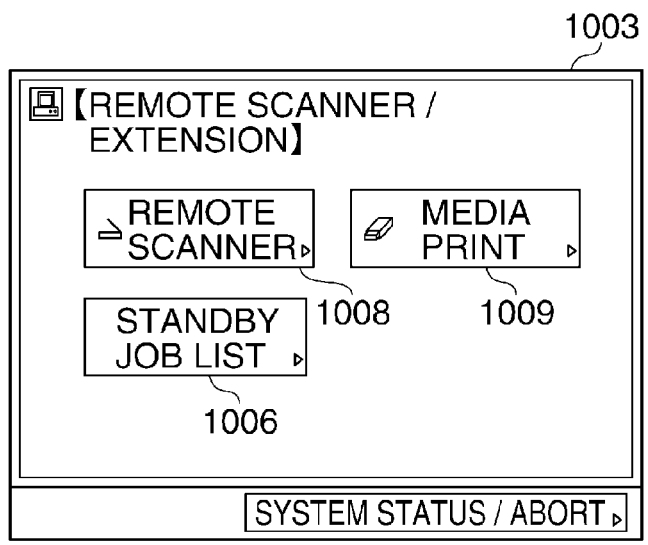

FIG. 5A, FIG. 5B, and FIG. 5C are views showing screen examples displayed on the panel 110.

FIG. 5A is a view showing a login screen 1001 at the time of using an IC card.

The login screen 1001 shows an operation method for a user who holds up an IC card over the authentication device 113, and shows that a completion sound that informs a user of completion of reading sounds when the authentication device 113 reads IC card information.

FIG. 5B is a view showing a general login screen 1002 through which a user ID and a password are inputted.

When a user depresses a "USER ID" button 1007 in the login screen 1002, a keyboard screen (not shown) is displayed. The user can input a user ID by using the keyboard screen.

When the user depresses a "PASSWORD" button 1004 in the login screen 1002, the keyboard screen is displayed. The user can input a password by using the keyboard screen.

When the user depresses a "LOGIN" button 1005 after inputting the user ID and the password, an authentication process is executed. Since a user ID and a password are not inputted in the example shown in FIG. 5B, the "LOGIN" button 1005 is grayed out. However, when a user ID and a password have been inputted, the "LOGIN" button 1005 is normally displayed without graying out.

FIG. 5C is a view showing a menu screen 1003.

A remote scanner button 1008, a medium print button 1009, and a standby job list button 1006 for displaying a standby job list that is a list of the job information stored in the HDD 102 as standby jobs are displayed on the menu screen 1003.

This menu screen 1003 is displayed when a user logged in from the login screen 1001 or 1002.

Figure 6A:
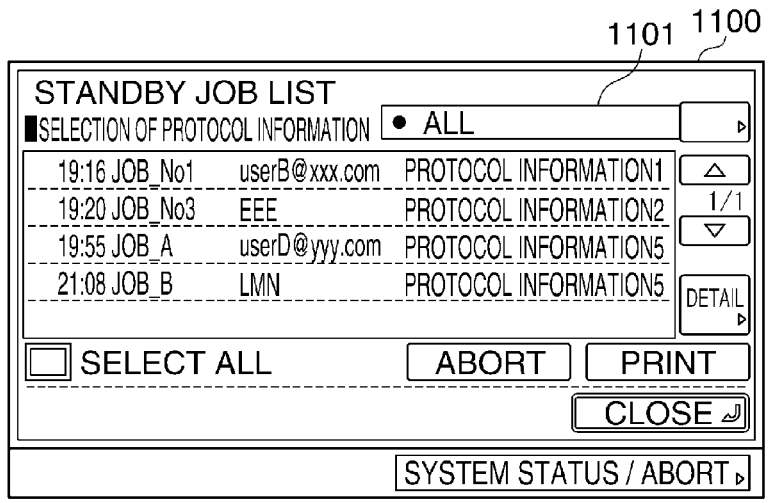
FIG. 6A, FIG. 6B, and FIG. 6C are views showing a standby job list screen displayed on the panel of the image forming apparatus in FIG. 1.
Figure 6B:
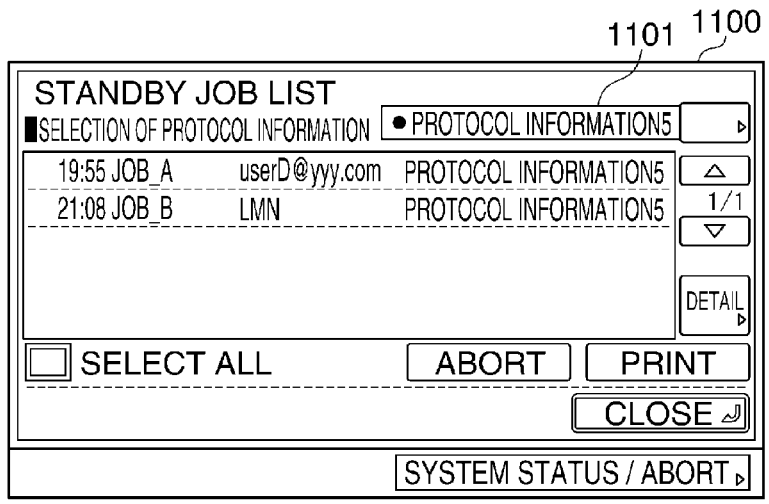
Figure 6C:
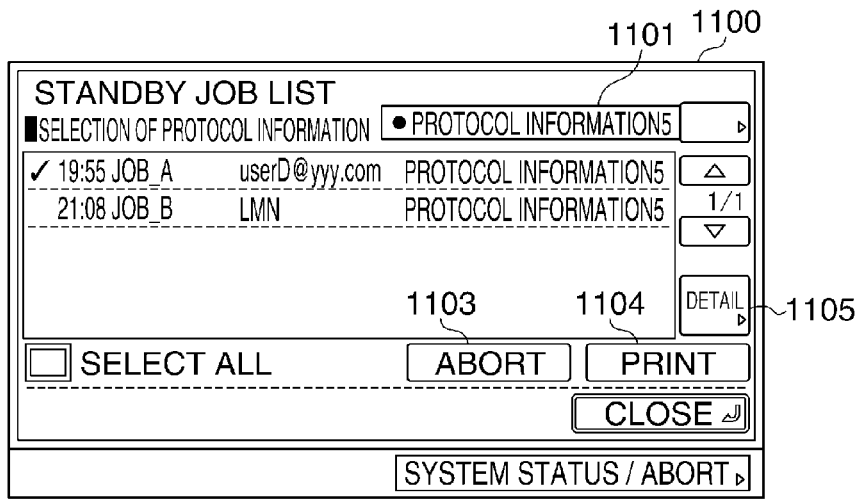

FIG. 6A, FIG. 6B, and FIG. 6C are views showing examples of standby job list screens displayed on the panel 110.

FIG. 6A is a view showing a standby job list screen 1100 that displays all the standby jobs.

This standby job list screen 1100 is displayed when the standby job list button 1006 is depressed, as mentioned above.

In this screen, all the standby jobs or standby jobs with specific protocol information are displayed by operating a pull-down menu 1101. The list of all the standby jobs is shown in FIG. 6A.

Moreover, FIG. 6A, FIG. 6B, and FIG. 6C show the standby job list screen 1100 in which the reception time, the file name, the user ID, and the protocol information that are included in the job information 600 are displayed.

FIG. 6B is a view showing the standby job list screen 1100 that displays the standby jobs with the specific protocol information.

As shown in a pull-down menu 1102, the list of the standby jobs with the protocol information 5 is shown in the standby job list screen 1100 in FIG. 6B.

FIG. 6C is a view showing the standby job list screen 1100 in which the standby job is selected.

In the standby job list screen 1100 in FIG. 6C, a job of which a file name is "job_A" is selected and a tick indicating it is displayed.

Thus, when one or more jobs are selected, a "DETAILED INFORMATION" button 1105, a "PRINT" button 1104, and a "STOP" button 1103 become possible to be depressed.

Figure 7A:
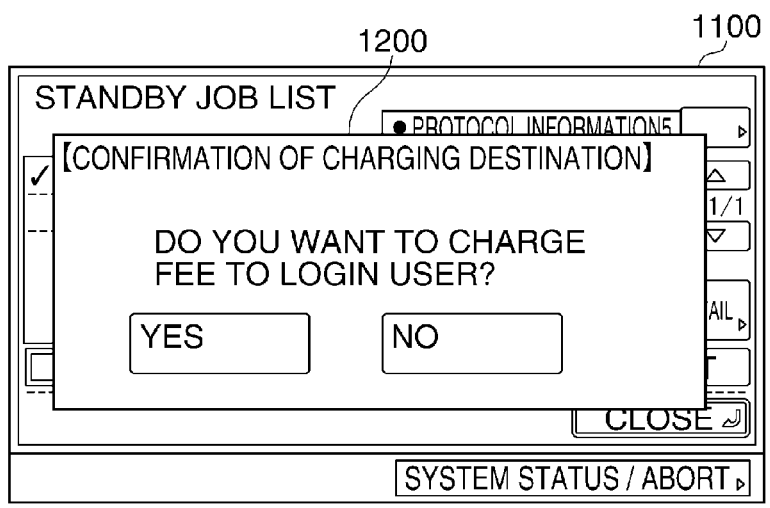
FIG. 7A, FIG. 7B, and FIG. 7C are views showing a charging destination confirmation window (FIG. 7A) and a detailed information display screen (FIG. 7B and FIG. 7C) that are displayed over the standby job list screen in FIG. 6C.
Figure 7B:
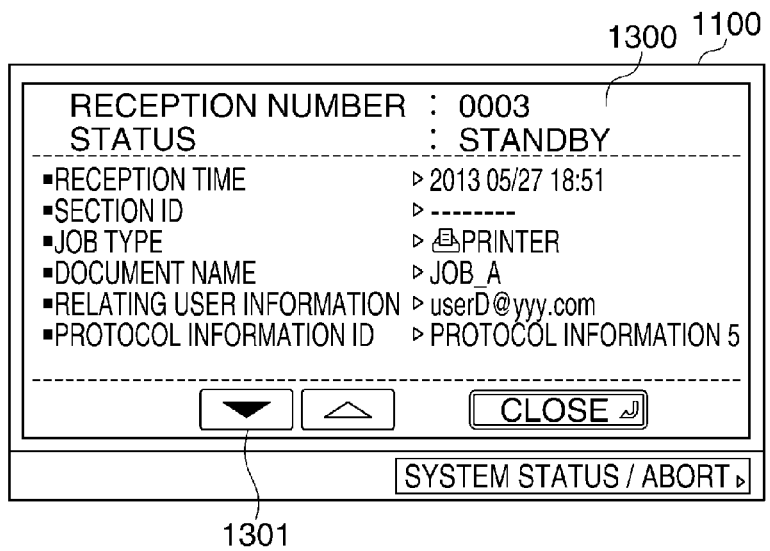
Figure 7C:
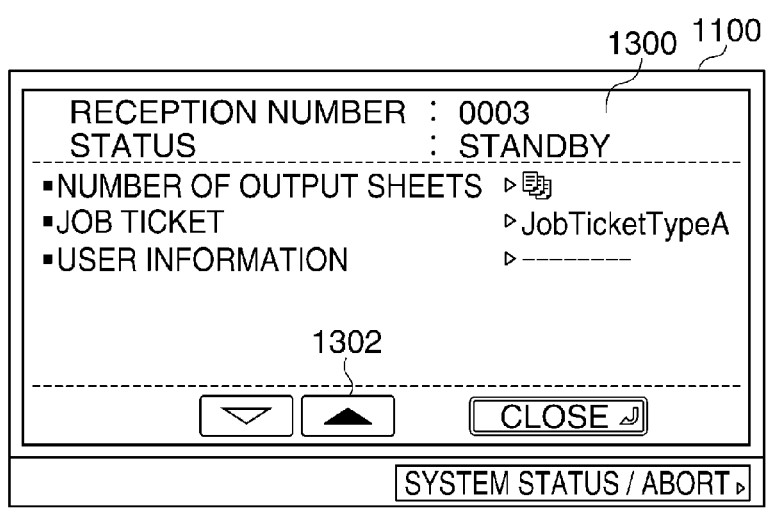

FIG. 7A, FIG. 7B, and FIG. 7C are views showing windows displayed over the standby job list screen in FIG. 6C.

FIG. 7A is a view showing a charging destination confirmation window 1200 to a login user.

This charging destination confirmation window 1200 is displayed when the user depresses the "PRINT" button 1104 in the standby job list screen 1100 in FIG. 6C.

FIG. 7A shows that the user D is charged as an example. When "YES" is selected, a job is executed. When "NO" is selected, a job is interrupted.

FIG. 7B and FIG. 7C are the views showing a detailed information display screen 1300.

This detailed information display screen 1300 is displayed when a user depresses the "DETAILED INFORMATION" button 1105 in the standby job list screen 1100 in FIG. 6C.

The detailed information display screen 1300 in FIG. 7B and FIG. 7C is a screen for displaying more detailed information than the information displayed in the standby job list screen 1100. Specifically, a reception number, a status, a reception time, a job type that shows a service content, a document name that shows a file name, relating user information, a protocol information ID, an output sheet number, a job ticket type, user information, etc. are displayed.

Moreover, a user can scroll the screen using arrow head buttons 1301 and 1302. When the arrow head button 1301 is depressed in the detailed information display screen 1300 in FIG. 7B, the detailed information display screen 1300 in FIG. 7C is displayed.

On the other hand, when a user depresses the arrow head button 1302 in the detailed information display screen 1300 in FIG. 7C, the detailed information display screen 1300 in FIG. 7B is displayed.

The user information is shown by hyphens in the detailed information display screen 1300 in FIG. 7C. This shows that a user who should be charged is undecided. When the user who should be charged has decided, the user information is displayed on this column.

Figure 8A:
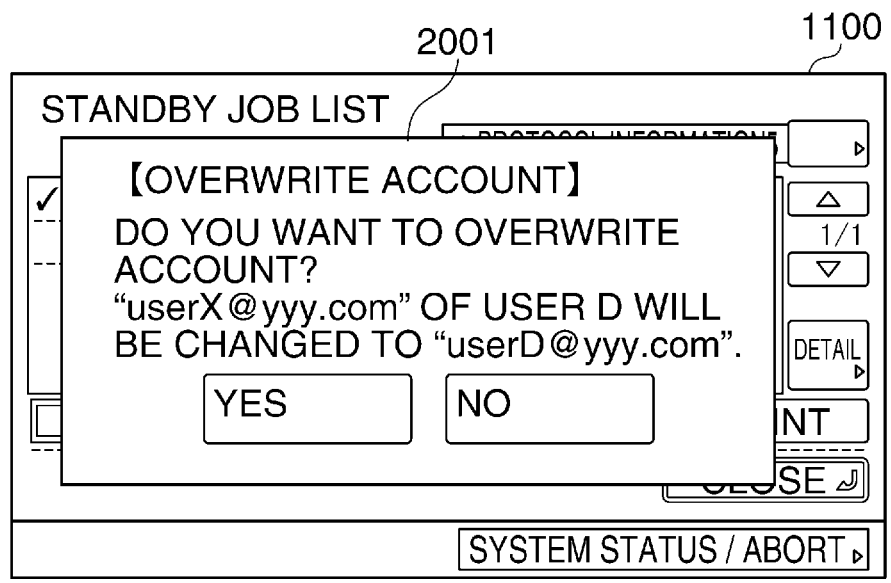
FIG. 8A and FIG. 8B are views showing an updating confirmation window for relating user information displayed over the standby job list screen in FIG. 6C.
Figure 8B:
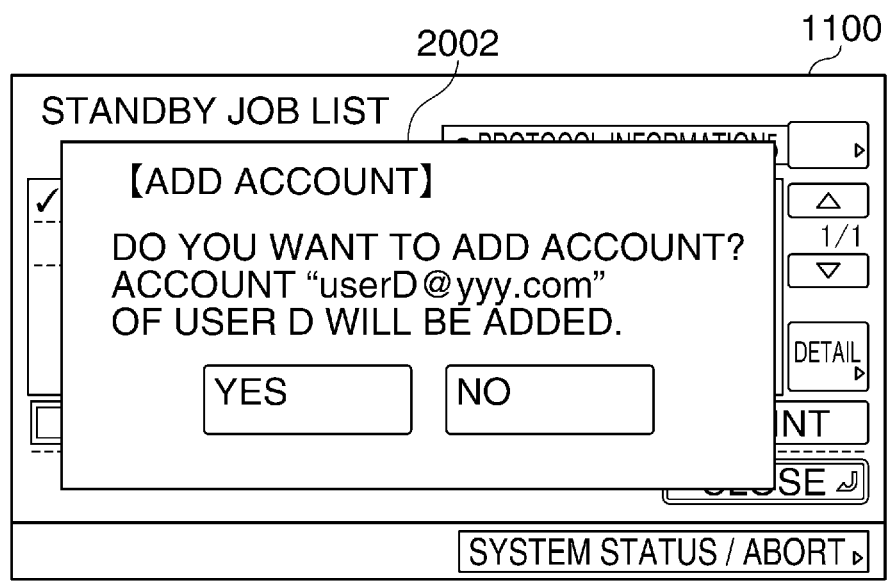

FIG. 8A and FIG. 8B are views showing updating confirmation windows for the relating user information displayed over the standby job list screen in FIG. 6C.

FIG. 8A is a view showing an overwrite confirmation window 2001.

This overwrite confirmation window 2001 is displayed when the account included in the relating user information is overwritten with another account. The screen in FIG. 8A requires a user to determine whether the account "userX@yyy.com" included in the user information about the user D is overwritten with the account "userD@yyy.com".

FIG. 8B is a view showing an addition confirmation window 2002.

This addition confirmation window 2002 is displayed when an account is further added to the relating user information. The screen in FIG. 8B requires a user to determine whether the account "userD@yyy.com" is allowed to be added to the relating user information about the login user D.

Figure 9:
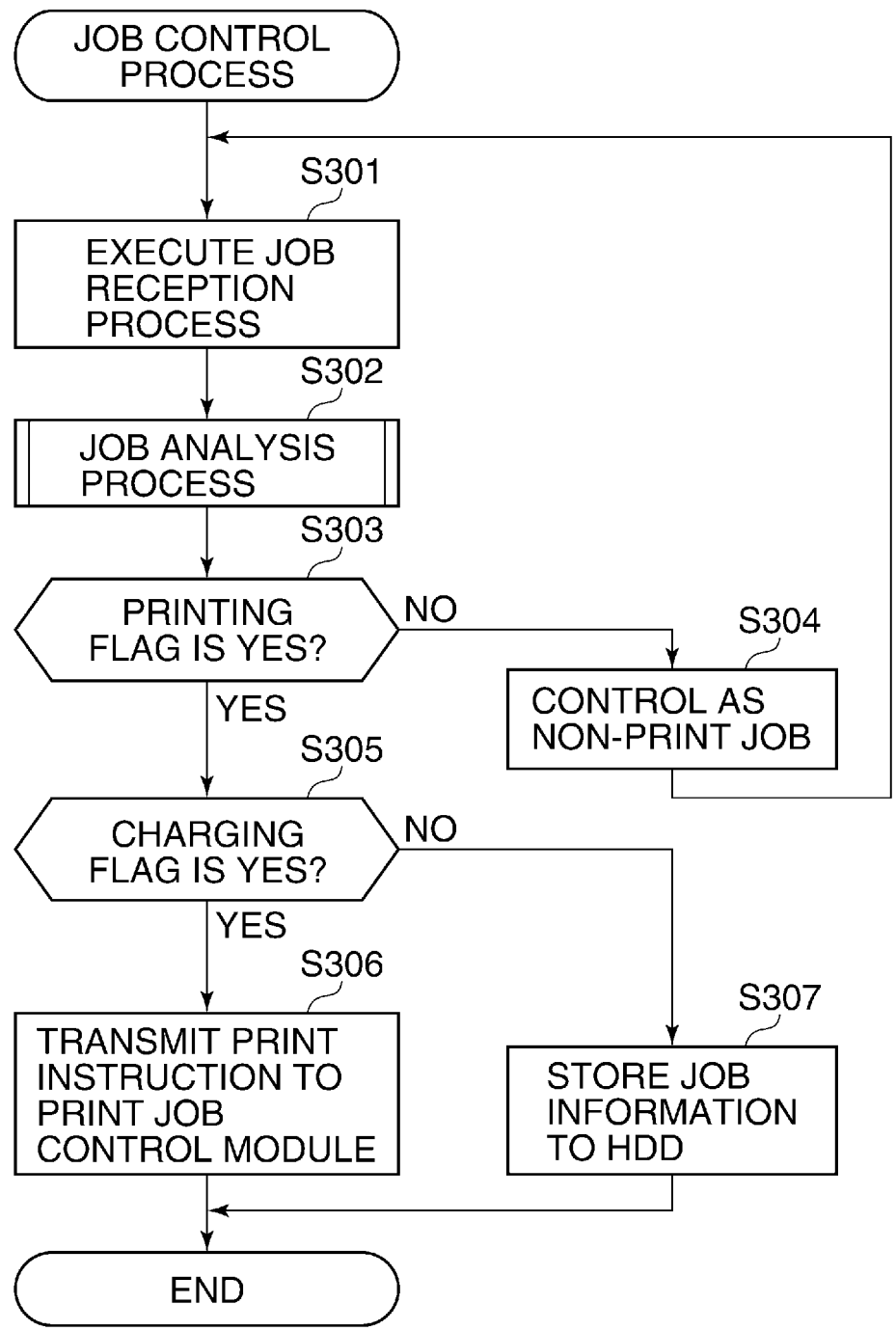
FIG. 9 is a flowchart showing procedures of a job control process executed by a CPU shown in FIG. 1.

FIG. 9 is a flowchart showing procedures of a job control process executed by the CPU 101 shown in FIG. 1.

As shown in FIG. 9, a job reception process is executed first (step S301). In this job reception process, the job information 600 shown in FIG. 3A is generated on the basis of the job data including the job ticket received with the external interface 109, and stores it to the RAM 104.

Next, a job analysis process in which a printing flag and a charging flag of the job information 600 are set is executed (step S302).

It is determined whether the printing flag is "YES" on the basis of the analysis result (step S303). As a result of the determination in the step S303, when the printing flag is not "YES" (NO in the step S303), the job is controlled as a non-print job that is not a print job (step S304), and the process returns to the step S301.

For example, when the job data is a scan job, it is controlled to transmit image data read into the scan destination from the scanner 111 to the transmission destination of the job data.

On the other hand, as a result of the determination in the step S303, when the printing flag is "YES" (YES in the step S303), it is determined whether the charging flag is "YES" (step S305).

As a result of the determination in the step S305, when the charging flag is "YES" (YES in the step S305), a print instruction is transmitted to the print job control module 205 (step S306) in order to perform the print job, and this process finishes.

On the other hand, as a result of the determination in the step S305, when the charging flag is not "YES" (NO in the step S305), the job information is stored in the HDD 102 as the job information about the standby job (step S307), and this process finishes.

It should be noted that the determination in the above-mentioned step S305 is usually "YES" when it is set not to charge.

Figure 10:
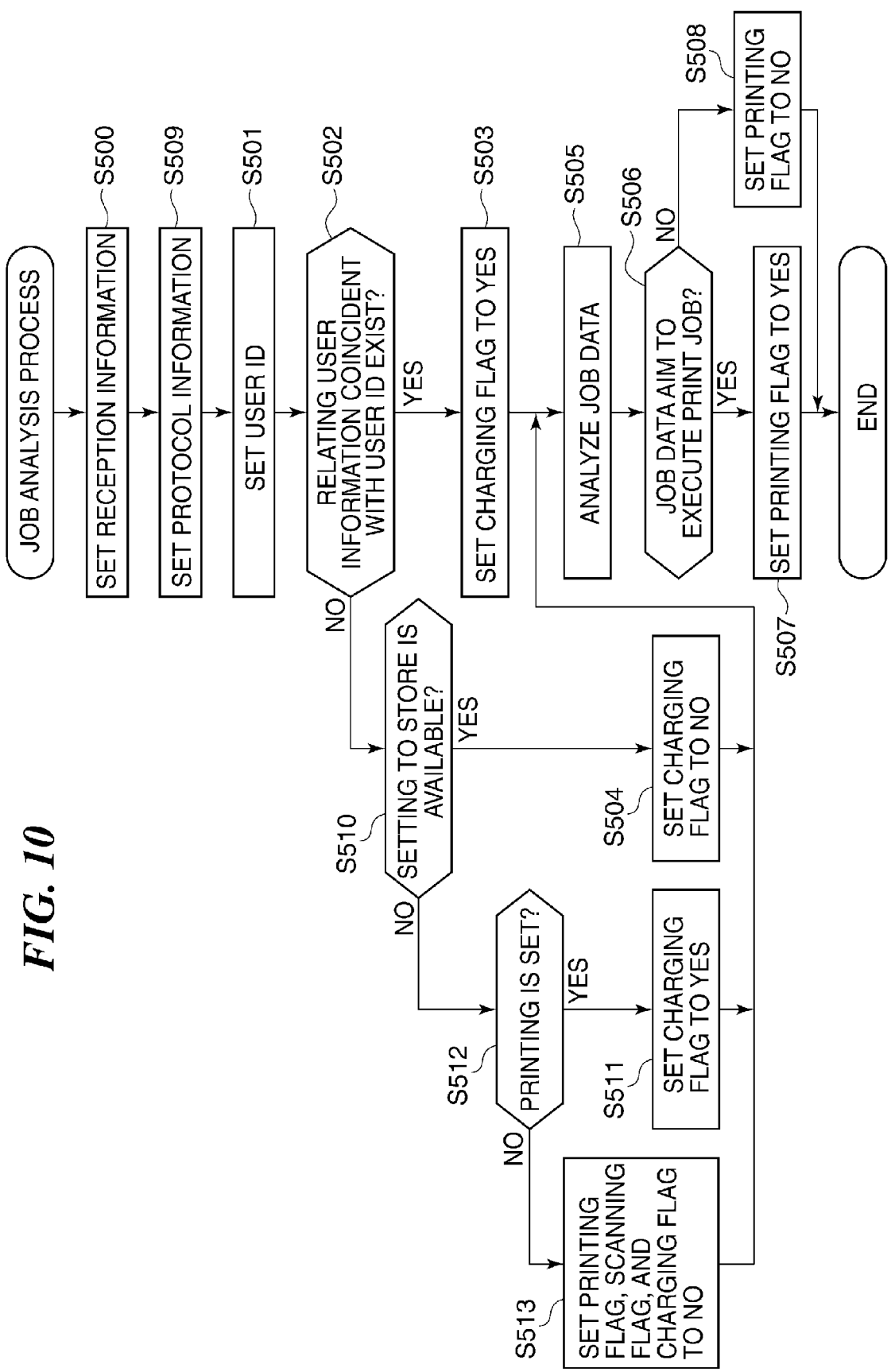
FIG. 10 is a flowchart showing procedures of a job analysis process executed in the step S302 in FIG. 9.

FIG. 10 is a flowchart showing procedures of the job analysis process in the step S302 in FIG. 9.

As shown in FIG. 10, the reception information in the job information 600 is set up first (step S500), the protocol information in the job information 600 is set up (step S509), and the user ID in the job information 600 is set up (step S501). The user ID is obtained from the job ticket or the job data of the job information 600 and is set up in the step S501. If the user ID could not be obtained, NULL that shows an undecided user is set to the user ID.

Next, it is determined whether the relating user information that coincides with the user ID among all the relating user information exists in the user information table 800 (step S502). This step S502 corresponds to the determination unit that determines whether the job information 600 allows charging.

As a result of the determination in the step S502, when the relating user information that coincides with the user ID exists (YES in the step S502), the charging flag of the job information 600 is set to "YES" (step S503).

Next, it is determined whether the job data aims to execute a print job (step S506) by analyzing the job ticket or the job data (step S505).

As a result of the determination in the step S506, when the job data aims to execute a print job (YES in the step S506), the printing flag of the job information 600 is set to "YES" (step S507), and this process finishes.

On the other hand, as a result of the determination in the step S506, when the job data does not aim to execute a print job (NO in the step S506), the printing flag of the job information 600 is set to "NO" (step S508), and this process finishes.

The description returns to the process in the step S502. As a result of the determination in the step S502, when the relating user information that coincides with the user ID does not exist (NO in the step S502), it is determined whether a setting to store the job data in the image forming apparatus 100 is available (step S510).

As a result of the determination in the step S510, when the setting to store the job data is available (YES in the step S510), the charging flag of the job information 600 is set to "NO" (step S504), and the process proceeds to the above-mentioned step S505.

On the other hand, as a result of the determination in the step S510, when the setting to store the job data is unavailable (NO in the step S510), it is determined whether the image forming apparatus 100 is set to print (step S512).

As a result of the determination in the step S512, when the image forming apparatus 100 is set to print (YES in the step S512), and the charging flag of the job information 600 is set to "YES" (step S511), while keeping the user ID undecided, and the process proceeds to the above-mentioned step S505.

On the other hand, as a result of the determination in the step S512, when the image forming apparatus 100 is not set to print (NO in the step S512), all the printing flag, the scanning flag, and the charging flag of the job information 600 are set to "NO" (step S513), and the process proceeds to the above-mentioned step S505.

Figure 11:
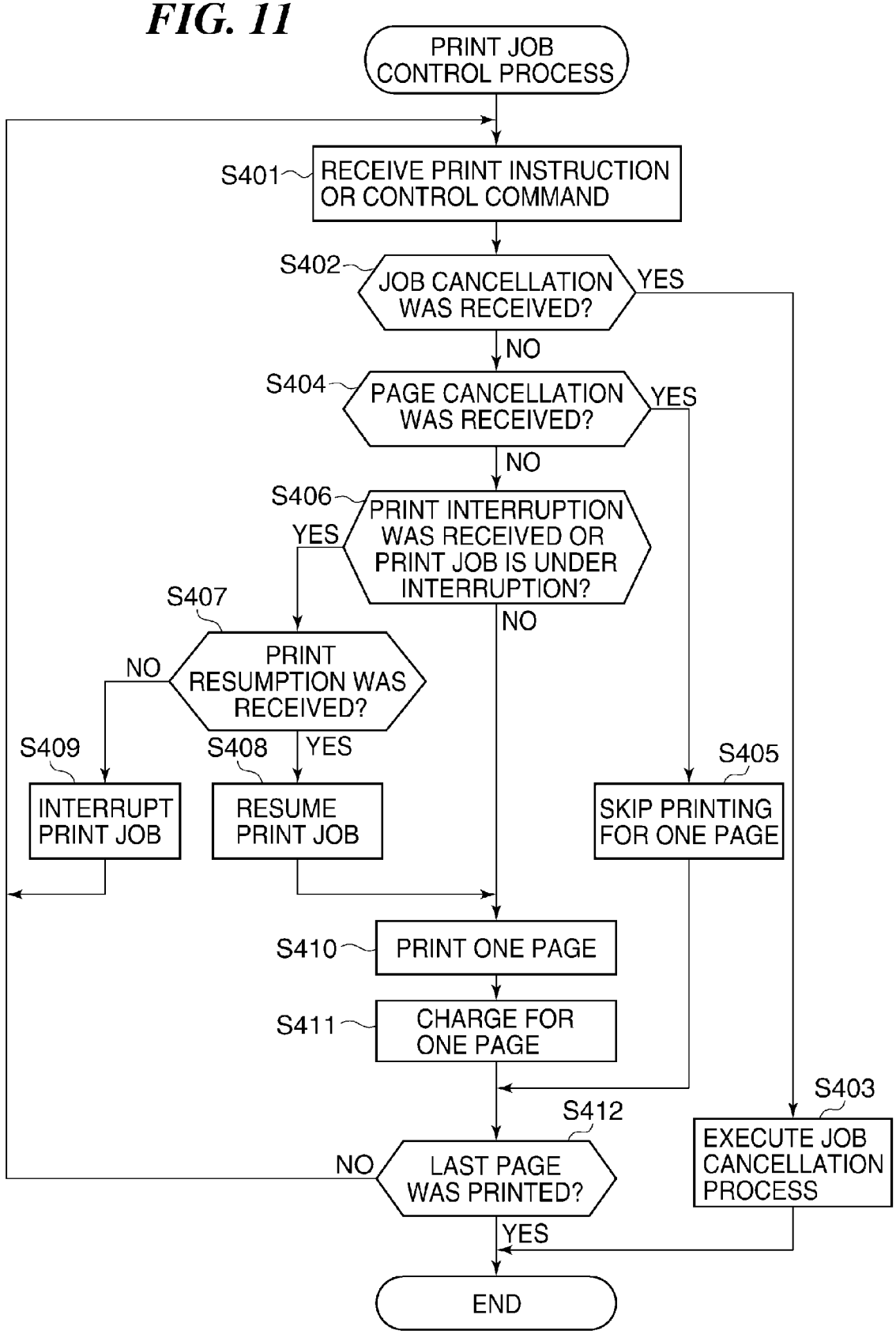
FIG. 11 is a flowchart showing procedures of a print job control process executed by the CPU shown in FIG. 1.

FIG. 11 is a flowchart showing procedures of a print job control process executed by the CPU 101 shown in FIG. 1.

As shown in FIG. 11, a print instruction or a control command is received (step S401). The control commands in the embodiment include a job cancellation for cancelling a print job, a page cancellation for cancelling printing of a page, a print interruption for interrupting a print job, and a print resumption for resuming a print job.

Next, it is determined whether the job cancellation was received (step S402). As a result of the determination in the step S402, the job cancellation was received (YES in the step S402), a job cancellation process is executed (step S403), and this process finishes.

On the other hand, as a result of the determination in the step S402, when the job cancellation was not received (NO in the step S402), it is determined whether the page cancellation was received (step S404).

As a result of the determination in the step S404, when the page cancellation was received (YES in the step S404), the printing for one page is skipped (step S405), and the process proceeds to the step S412.

On the other hand, as a result of the determination in the step S404, when the page cancellation was not received (NO in the step S404), it is determined whether the print interruption was received or a print job is under interruption (step S406). It is determined whether a print job is under interruption on the basis of the job status of the job information 600.

As a result of the determination in the step S406, when the print interruption was not received and the print job is not under interruption (NO in the step S406), the printer 112 is controlled through the printer interface 107 to print one page (step S410).

Next, the charge for one page is reflected to the first charging information corresponding to the user who instructed to execute the print job in the user information table (step S411), and accordingly the charging content is also reflected to the second charging information. This step S411 corresponds to the charging unit that charges to the chargeable user who logged in to the image forming apparatus 100 and instructed to execute the print job.

Next, it is determined whether the last page of the pages that should be printed has been printed (step S412). As a result of the determination in the step S412, when the last page has not been printed (NO in the step S412), the process returns to the step S401.

On the other hand, as a result of the determination in the step S412, when the last page has been printed (YES in the step S412), this process finishes.

The description returns to the step S406. As a result of the step S406, when the print interruption was received or the print job is under interruption (YES in the step S406), it is determined whether the print resumption was received (step S407).

As a result of the determination in the step S407, when the print resumption was received (YES in the step S407), the print job is resumed (step S408) by setting the job status in the job information 600 to "EXECUTION", and the process proceeds to the step S410.

On the other hand, as a result of the determination in the step S407, when the print resumption was not received (NO in the step S407), the job status of the job information 600 is set to "INTERRUPTION", the print job is interrupted (step S409), and the process returns to the above-mentioned step S401.

According to the processes shown in FIG. 9 though FIG. 11, although the print job corresponding to the job information in which the printing flag is "YES" and the charging flag is "YES" is executed normally, the print job corresponding to the job information in which the printing flag is "YES" and the charging flag is "NO" is stored in the HDD 102 as a standby job.

In this case, when a user logs in to the image forming apparatus 100 and charging to the user is allowed, execution of the print job becomes possible in this embodiment. Hereinafter, this process will be described.

Figure 12:
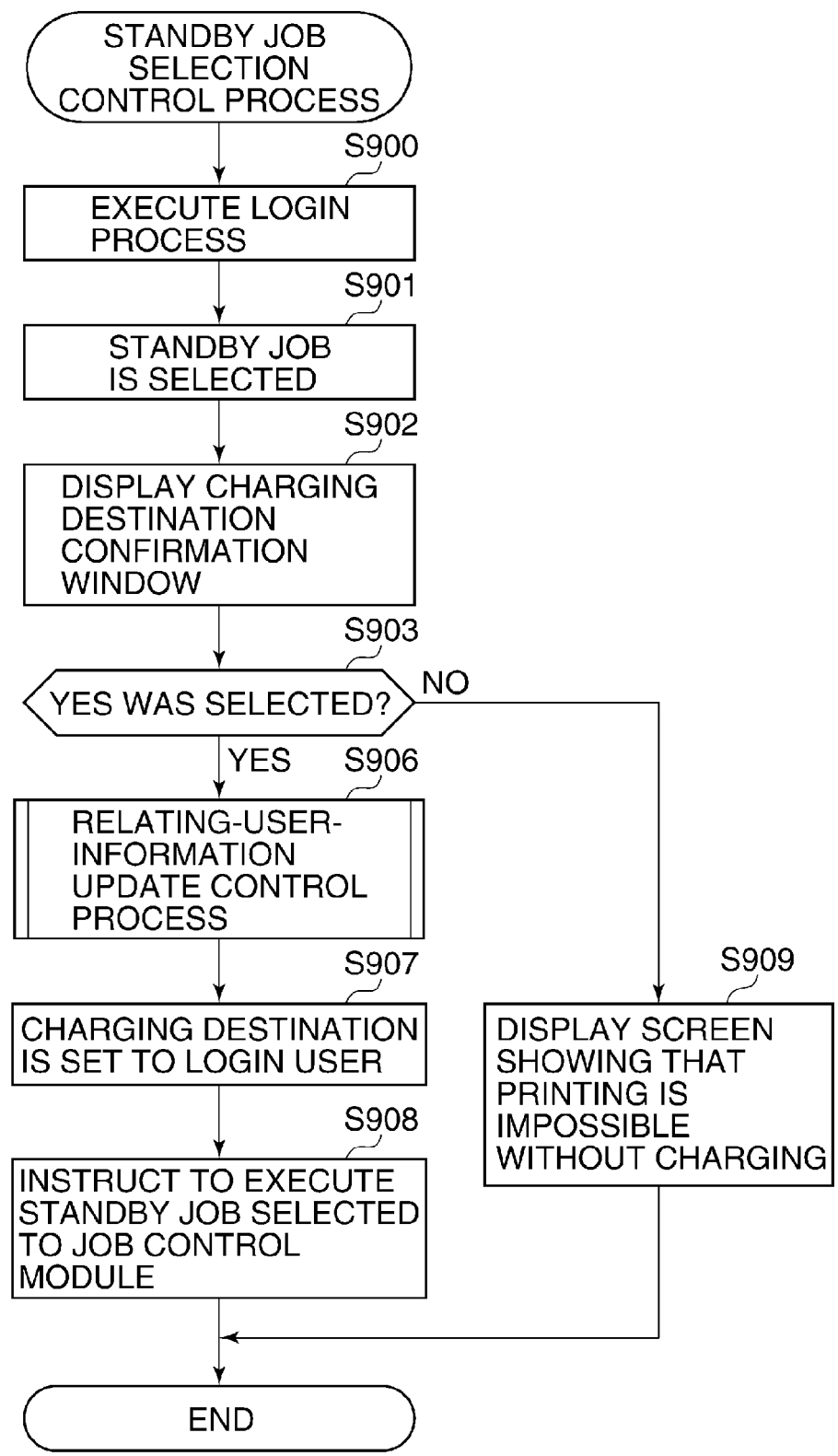
FIG. 12 is a flowchart showing procedures of a standby job selection control process executed by the CPU in FIG. 1.

FIG. 12 is a flowchart showing procedures of a standby job selection control process executed by the CPU 101 in FIG. 1.

As shown in FIG. 12, a login process is executed first (step S900). Specifically, the login screen 1001 shown in FIG. 5A is displayed, and the user ID included in the IC card that the user holds up over the authentication device 113 is read.

Then, the user information table 800 is searched for the user ID, and the user who coincides with the user ID of the IC card is decided. Information about the decided user is stored in the RAM 104 as a currently logged-in user.

Next, the standby job list screen 1100 shown in FIG. 6A, or the standby job list screen 1100 shown in FIG. 6B in which the standby jobs with the specific protocol information are listed is displayed, and accordingly the standby jobs of which the charging flags are "NO" are listed.

When the user selects the standby job (step S901), a tick is displayed to the standby job selected as shown in FIG. 6C. When the user depresses the "PRINT" button 1104, the charging destination confirmation window 1200 shown in FIG. 7A is displayed (step S902).

It is determined whether the user selected "YES" on this charging destination confirmation window 1200 (step S903).

As a result of the determination in the step S903, when the user does not select "YES" (NO in the step S903), a screen (not shown) showing that printing is impossible without charging is displayed on the panel 110 (step S909), and this process finishes.

On the other hand, as a result of the determination in the step S903, when the user selects "YES" (YES in the step S903), a relating-user-information update control process is executed for updating the relating user information required in order to execute the standby job of which the charging flag is "NO" (step S906).

Then, the charging destination is set to the login user (step S907), execution of the standby job selected by the login user is instructed to the job control module 204 (step S908), and this process finishes. Then, the print job is executed and the login user is charged according to the print job control process in FIG. 11.

Figure 13:
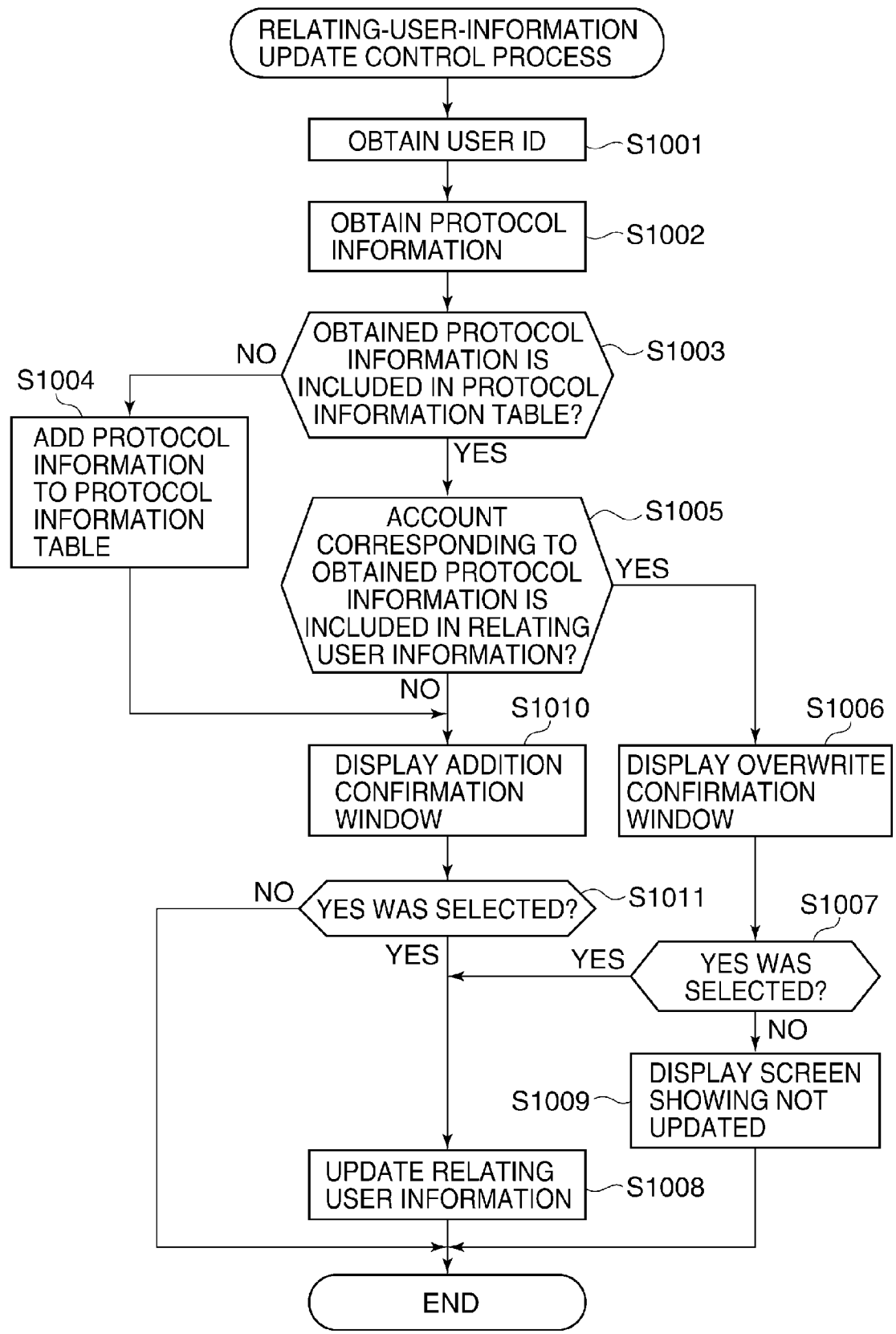
FIG. 13 is a flowchart showing procedures of a relating-user-information update control process executed in the step S906 in FIG. 12.

FIG. 13 is a flowchart showing procedures of a relating-user-information update control process executed in the step S906 in FIG. 12.

As shown in FIG. 13, a user ID is obtained (step S1001). A user ID is usually obtained from a job ticket. When a user ID does not exist in the job ticket, the user ID is obtained from owner information etc. in the job data.

Next, the protocol information about the selected standby job is obtained (step S1002). Then, it is determined whether the obtained protocol information exists in the protocol information table 801 (step S1003).

As a result of the determination in the step S1003, when the obtained protocol information does not exists in the protocol information table 801 (NO in the step S1003), the obtained protocol information is added to the protocol information table 801 (step S1004), and the process proceeds to the step S1010. In this step S1004, the protocol information ID of the added protocol information is added to each user ID included in the user information table 800.

On the other hand, as a result of the determination in the step S1003, when the protocol information exists in the protocol information table 801 (YES in the step S1003), the user information table 800 is searched for the relating user information corresponding to the user ID obtained in the step S1001 using the protocol information ID of the obtained protocol information. Then, it is determined whether the account corresponding to the obtained protocol information ID is included in the relating user information (step S1005).

As a result of the determination in the step S1005, when the account corresponding to the protocol information ID does not exist (NO in the step S1005), the addition confirmation window 2002 shown in FIG. 8B is displayed (step S1010).

Next, it is determined whether "YES" was selected in the addition confirmation window 2002 (step S1011). As a result of the determination in the step S1011, when "YES" was not selected (NO in the step S1011), this process finishes.

On the other hand, as a result of the determination in the step S1011, when "YES" was selected (YES in the step S1011), the relating user information is updated by adding the account included in the job information to the relating user information corresponding to the user ID and the protocol information ID in the user information table 800 (step S1008), and this process finishes.

The description returns to the step S1005. As a result of the determination in the step S1005, when the relating user information corresponding to the protocol information exists (YES in the step S1005), the overwrite confirmation window 2001 shown in FIG. 8A is displayed (step S1006).

Next, it is determined whether "YES" was selected in the overwrite confirmation window 2001 (step S1007). As a result of the determination in the step S1007, when "YES" was not selected (NO in the step S1007), a screen (not shown) showing that it was not overwritten is displayed on the panel 110 (step S1009), and this process finishes.

On the other hand, as a result of the determination in the step S1007, when "YES" was selected (YES in the step S1007), the relating user information is updated by overwriting the account corresponding to the user ID and the protocol information ID in the user information table 800 with the account included in the job information (step S1008), and this process finishes.

According to the processes in FIG. 12 and FIG. 13 mentioned above, when a user of the charging destination is undecided, a print job is stored as a standby job, and then, a fee is charged to a user who instructs to print after login. Accordingly, it becomes possible to charge the fee for the print job of which a charging destination is undecided.

Furthermore, since the relating user information about the user who instructs to execute the standby job of which the charging destination user is undecided is updated, the updated relating user information is available from the next time, which enables to print and to charge without requiring a user to log in.

In this way, the user information table 800 is updated by adding a combination of a protocol information ID and an account included in job information to an item in the user information table 800 corresponding to a chargeable user who instructed to execute a print job of which a charging destination user is undecided, or by overwriting the item with the combination in the first embodiment.

Next, a second embodiment that uses a user information table different from the user information table 800 will be described.

FIG. 14 is a view showing a user information table 1400 in the second embodiment.

The user information table 1400 shown in FIG. 14 is configured by removing the relating user information from the user information table 800. The relating user information is stored in an IC card in the second embodiment. Moreover, the user ID and the charging information in FIG. 14 are the same as that in the user information table 800.

It should be noted that the second embodiment also employs the protocol information table 801 shown in FIG. 4B. The protocol information table 801 may be collectively managed by a server.

If the user information, the relating user information, and the protocol information are collectively managed by a server, it becomes possible to manage the user information and the charging for a plurality of image forming apparatuses using the same IC card.

Figure 15:
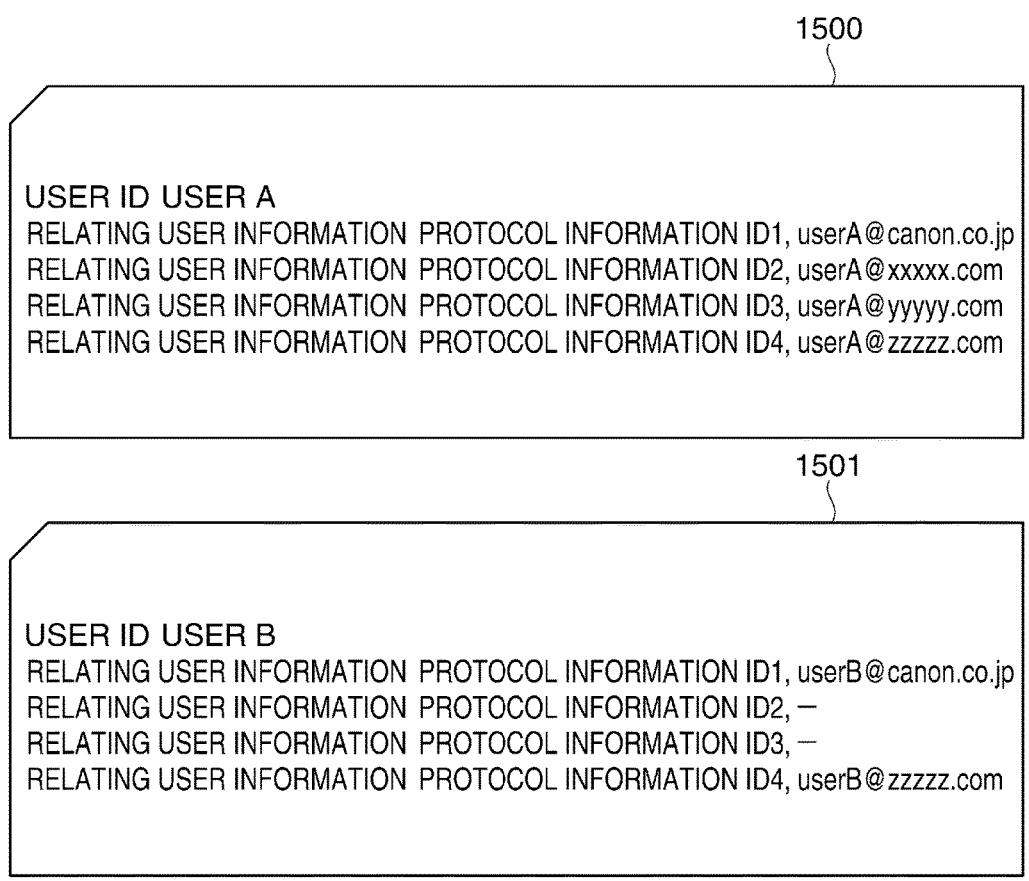
FIG. 15 is a view showing information stored in IC cards in the second embodiment.

FIG. 15 is a view showing information stored in IC cards in the second embodiment.

Two IC cards 1500 and 1501 are shown in FIG. 15. A user ID, protocol information IDs, and accounts as relating user information corresponding to the protocol information IDs are stored in each of the IC cards 1500 and 1501.

When a user holds up the IC card 1500 over the authentication device 113, the CPU 101 reads the user ID, the protocol information IDs, and the accounts in the IC card 1500 through the card interface 108.

Then, a fee for a job executed after login is charged to the user indicated by the read user ID. Moreover, the CPU 101 stores the user ID, the protocol information IDs, and the accounts to the RAM 104, and updates the charging information on the basis of the charging information for each protocol information ID shown in FIG. 14.

It should be noted that there are no accounts corresponding to some protocol information IDs in the IC card 1501. This shows examples where accounts corresponding to the protocol information IDs do not exist.

In this way, the combinations of the protocol information IDs and the accounts are stored in the IC card that is required when a user logs in to the image forming apparatus 100 in the second embodiment.

Moreover, the IC card in the second embodiment is able to be used also for the image forming apparatus in the first embodiment equipped with not the user information table 1400 but the user information table 800. In this case, the combinations of the protocol information IDs and the accounts that the IC card stores are synchronized with the combinations of the protocol information IDs and the accounts that the user information table 800 includes.

Even for another image forming apparatus that a user has not used, synchronization is performed when a user holds up the IC card. As a result, printing and charging become possible.

Figure 16A:
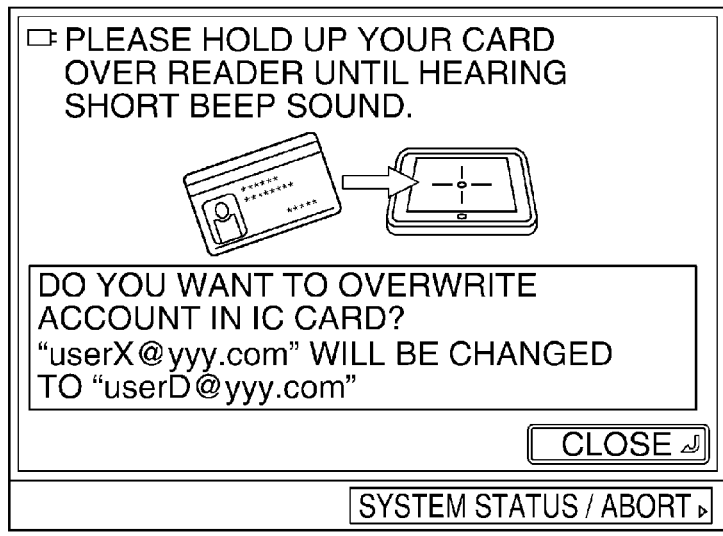
FIG. 16A, FIG. 16B, and FIG. 16C are views showing screens about updating relating user information in the second embodiment.
Figure 16B:
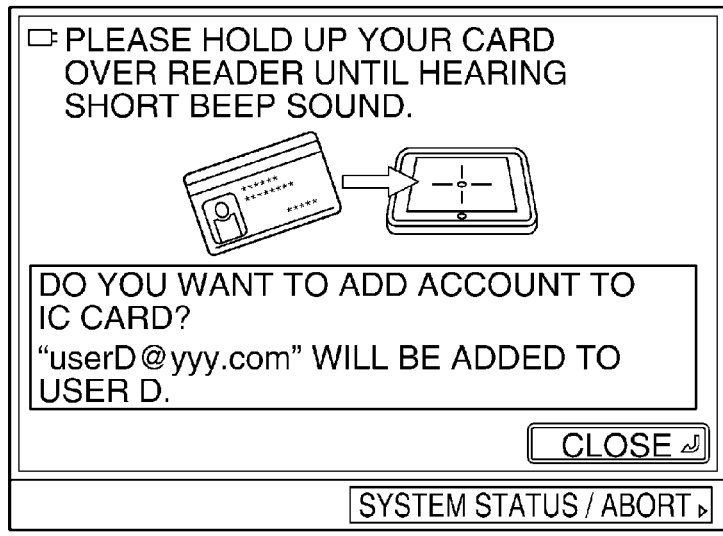
Figure 16C:
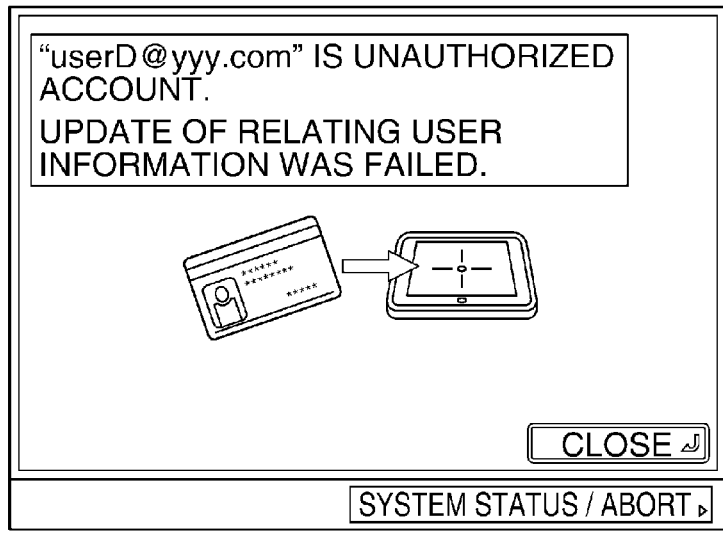

FIG. 16A, FIG. 16B, and FIG. 16C are views showing screens about updating the relating user information in the second embodiment.

FIG. 16A is a view showing an overwrite confirmation window 2101.

This overwrite confirmation window 2101 is displayed when the account is overwritten with another account. The screen in FIG. 16A requires a user to determine whether the account "userX@yyy.com" of the user D is overwritten with the account "userD@yyy.com".

Unlike the screen in FIG. 8A, "YES" is selected when the user holds up the IC card, and "NO" is selected when the user depresses a "CLOSE" button.

FIG. 16B is a view showing an addition confirmation window 2102.

This addition confirmation window 2102 is displayed when an account is further added to the relating user information. The screen in FIG. 16B requires a user to determine whether the account "userD@yyy.com" is added to the relating user information about the login user D.

Unlike the screen in FIG. 8B, "YES" is selected when the user holds up the IC card, and "NO" is selected when the user depresses a "CLOSE" button.

FIG. 16C is a view showing an update failed screen 2103 displayed when the update was failed because the relating user information added or overwritten includes an unauthorized account.

Next, each process in the image forming apparatus in the second embodiment will be described. The processes shown in FIG. 9 through FIG. 11 are common also in the second embodiment.

Figure 17:
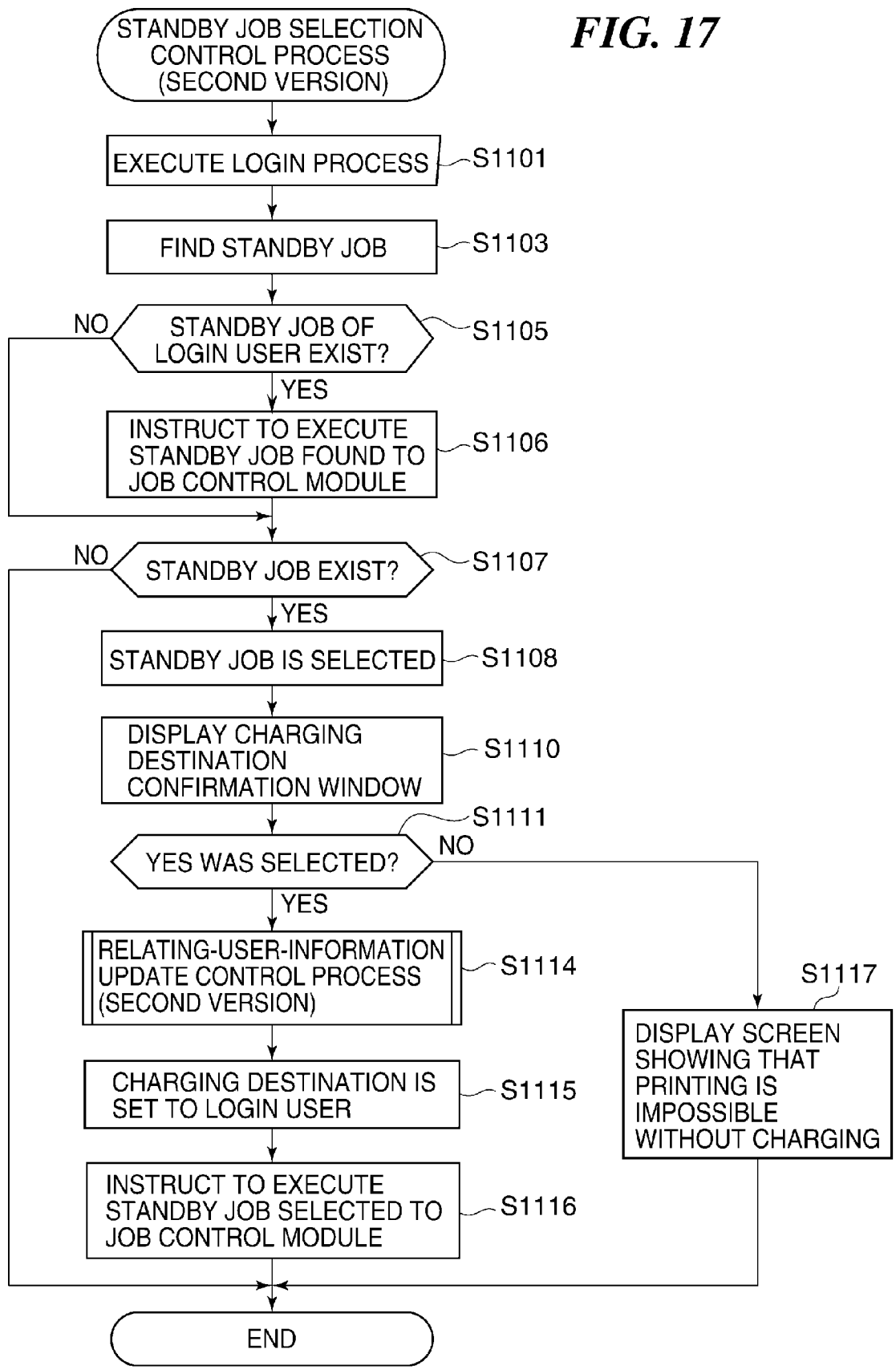
FIG. 17 is a flowchart showing procedures of a standby job selection control process (second version) in the second embodiment.

FIG. 17 is a flowchart showing procedures of a standby job selection control process (second version) in the second embodiment.

As shown in FIG. 17, a login process is executed first (step S1101). Specifically, the login screen 1001 shown in FIG. 5A is displayed, and the user ID, the protocol information IDs and the accounts (the relating user information) included in the IC card are read when the user holds up the IC card over the authentication device 113.

Next, standby jobs are found (step S1103), and it is determined whether a standby job of the login user exists (step S1105). Here, when the combination of the protocol information and the account included in the job information coincides with the combination of the protocol information and the account corresponding to the protocol information ID stored in the IC card, it is determined that the standby job of the login user exists.

As a result of the determination in the step S1105, when a standby job of the login user does not exist (NO in the step S1105), the process proceeds to the step S1107.

On the other hand, as a result of the determination in the step S1105, when a standby job of the login user exists (YES in the step S1105), the charging destination is set to the login user, and execution of the found standby job is instructed to the job control module 204 (step S1106).

Next, it is determined whether another standby job exists (step S1107). As a result of the determination in the step S1107, when another standby job does not exist (NO in the step S1107), this process finishes.

On the other hand, as a result of the determination in the step S1107, when another standby job exists (YES in the step S1107), the standby job list screen 1100 shown in FIG. 6A or FIG. 6B is displayed to make a user select a standby job (step S1108). Accordingly, a tick is displayed on the standby job selected as shown in FIG. 6C. When the user depresses the "PRINT" button 1104 on this screen, the charging destination confirmation window 1200 shown in FIG. 7A is displayed (step S1110).

It is determined whether the user selected "YES" in this charging destination confirmation window 1200 (step S1111).

As a result of the determination in the step S1111, when "YES" was not selected by the user (NO in the step S1111), a screen (not shown) showing that printing is impossible without charging is displayed on the panel 110 (step S1117), and this process finishes.

On the other hand, as a result of the determination in the step S1111, when "YES" was selected by the user (YES in the step S1111), a relating-user-information update control process (second version) is executed (step S1114).

Then, the charging destination is set to the login user (step S1115), execution of the standby job selected by the login user is instructed to the job control module 204 (step S1116), and this process finishes.

Figure 18:
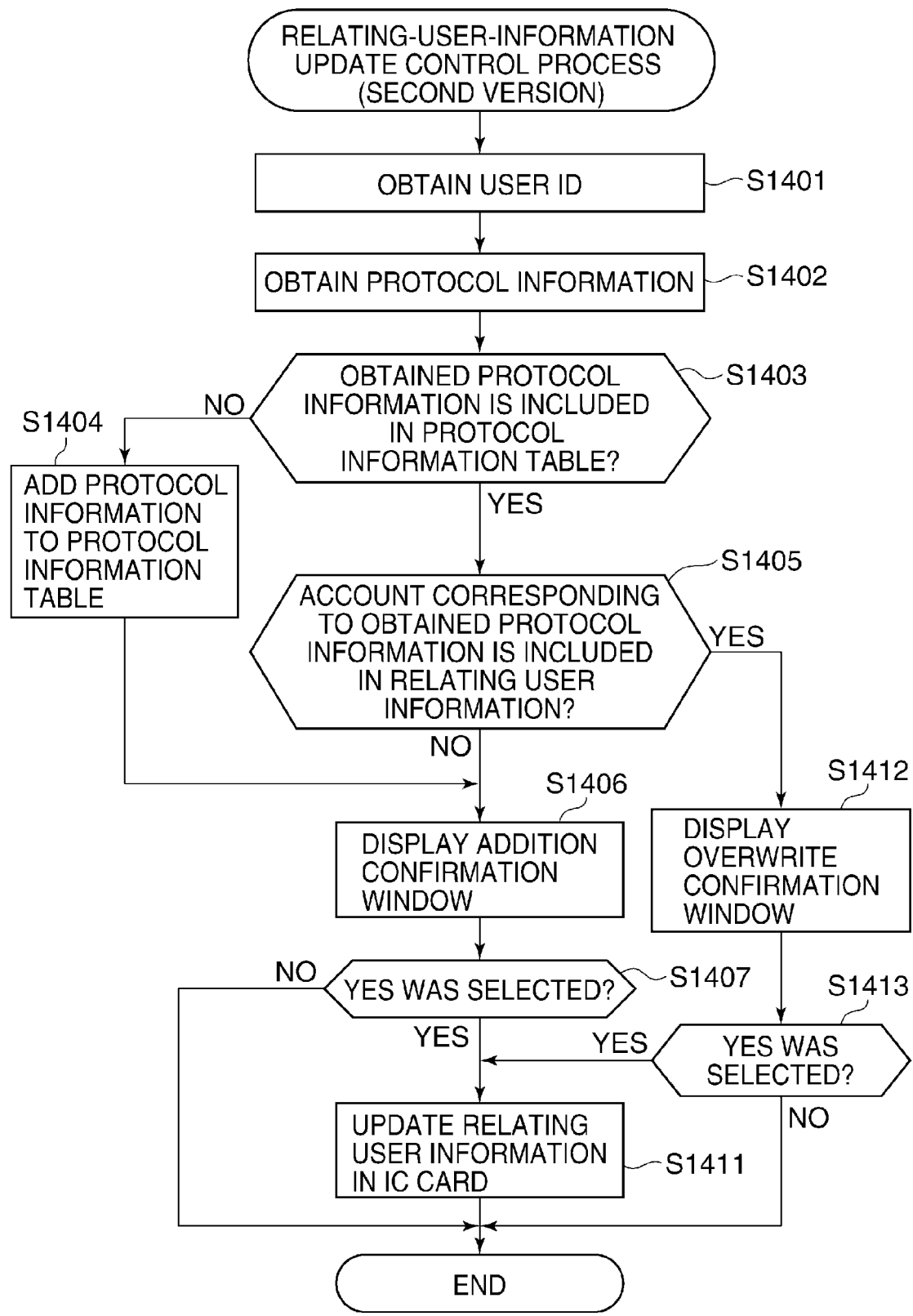
FIG. 18 is a flowchart showing procedures of a relating-user-information update control process (second version) executed in the step S1114 in FIG. 17.

FIG. 18 is a flowchart showing procedures of a relating-user-information update control process (second version) executed in the step S1114 in FIG. 17.

As shown in FIG. 18, the user ID 704 is obtained first from the job ticket (step S1401), and the protocol information in the selected standby job is obtained (step S1402). Then, it is determined whether the obtained protocol information is included in the protocol information table 801 (step S1403).

As a result of the determination in the step S1403, when the protocol information does not exist in the protocol information table 801 (NO in the step S1403), the obtained protocol information is added to the protocol information table 801 (step S1404), and the process proceeds to the step S1406.

On the other hand, as a result of the determination in the step S1403, when the protocol information exists in the protocol information table 801 (YES in the step S1403), the relating user information in the IC card is searched using the protocol information ID of the obtained protocol information. Then, it is determined whether the account corresponding to the obtained protocol information ID is set in the IC card (step S1405).

As a result of the determination in the step S1405, when the account corresponding to the protocol information ID is not set up (NO in the step S1405), the addition confirmation window 2102 shown in FIG. 16B is displayed (step S1406).

Next, it is determined whether "YES" was selected in the addition confirmation window 2102 by holding up the IC card by the user (step S1407). As a result of the determination in the step S1407, when "YES" was not selected (NO in the step S1407), this process finishes.

On the other hand, as a result of the determination in the step S1407, when "YES" was selected (YES in the step S1407), the relating user information is updated by adding the account included in the job information corresponding to the protocol information ID in the IC card (step S1411), and this process finishes.

The description returns to the step S1405. As a result of the determination in the step S1405, when the account corresponding to the protocol information is set up (YES in the step S1405), the overwrite confirmation window 2101 shown in FIG. 16A (step S1412).

Next, it is determined whether "YES" was selected in the addition confirmation window 2101 by holding up the IC card by the user (step S1413). As a result of the determination in the step S1413, when "YES" was not selected (NO in the step S1413), this process finishes.

On the other hand, as a result of the determination in the step S1413, when "YES" was selected (YES in the step S1413), the relating user information is updated by overwriting the account corresponding to the protocol information ID in the IC card with the account included in the job information (step S1411), and this process finishes. In this way, the contents stored in the IC card are updated by adding or overwriting with the combination of the protocol information ID corresponding to the protocol information included in the job information and the account to the IC card that is held by the chargeable user who instructed to execute the print job of which the job information does not allow charging in the second embodiment.

According to the processes in FIG. 17 and FIG. 18, since the relating user information is stored in the IC card, it becomes possible to print the standby job and to charge a fee based on the information in this IC card.

Moreover, when the user logs in by holding up the IC card over the authentication device 113, it becomes possible to print the print job automatically and to charge a fee based on the information in the IC card, which does not require the user to select a standby job.

Furthermore, when the relating user information in the IC card of a user who executed a standby job of which a charging destination is undecided, the updated relating user information is available from the next time. Accordingly, printing and charging become possible when the user logs in by holding up the IC card over the authentication device 113.

In the above-mentioned relating-user-information update control process (second version) in FIG. 18, when the user selects "YES" in the overwrite confirmation window 2101 or the addition confirmation window 2102, the relating user information is immediately updated in the step S1411. However, the relating user information may be updated only after authentication by an authentication server. A process that needs authentication by an authentication server is shown in FIG. 19.

Figure 19:
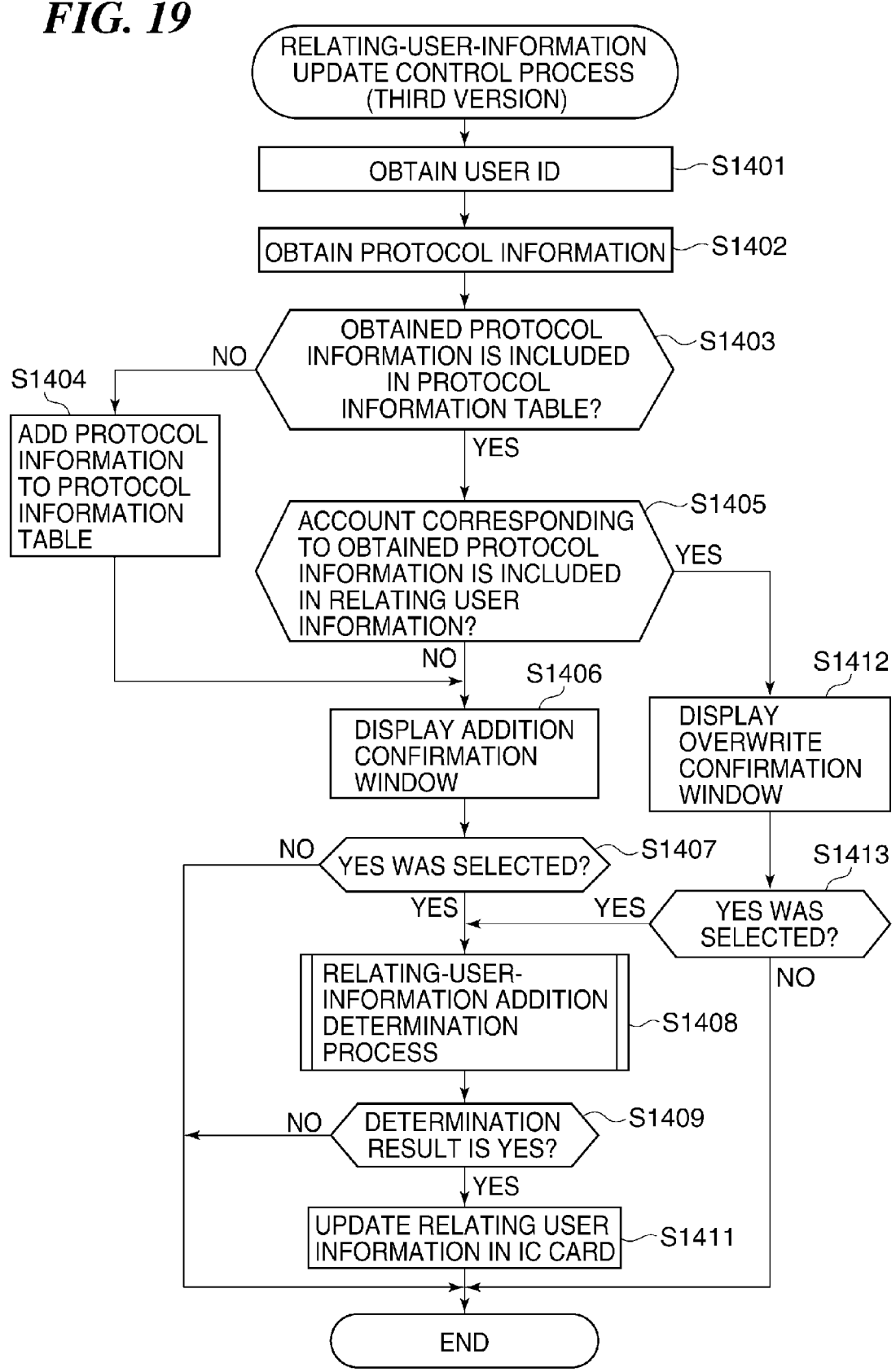
FIG. 19 is a flowchart showing procedures of a relating-user-information update control process (third version) executed in the step S1114 in FIG. 17.

FIG. 19 is a flowchart showing procedures of a relating-user-information update control process (third version) executed in the step S1114 in FIG. 17.

This relating-user-information update control process (third version) is configured by adding a procedure to authenticate by an authentication server between the step S1407 or S1413 and the step S1411 in the relating-user-information update control process (second version). Since other procedures are the same as that in FIG. 18, their descriptions are omitted.

When it is determined that the user selects "YES" in the step S1407 or S1413, a relating-user-information addition determination process for communicating with an authentication server (step S1408).

Then, it is determined whether the determination result of the relating-user-information addition determination process is "YES" (step S1409).

As a result of the determination in the step S1409, when the determination result is not "YES" (NO in the step S1409), this process finishes.

On the other hand, as a result of the determination in the step S1409, when the determination result is "YES" (YES in the step S1409, the relating user information in the IC card is updated (step S1411), and this process finishes.

Figure 20:
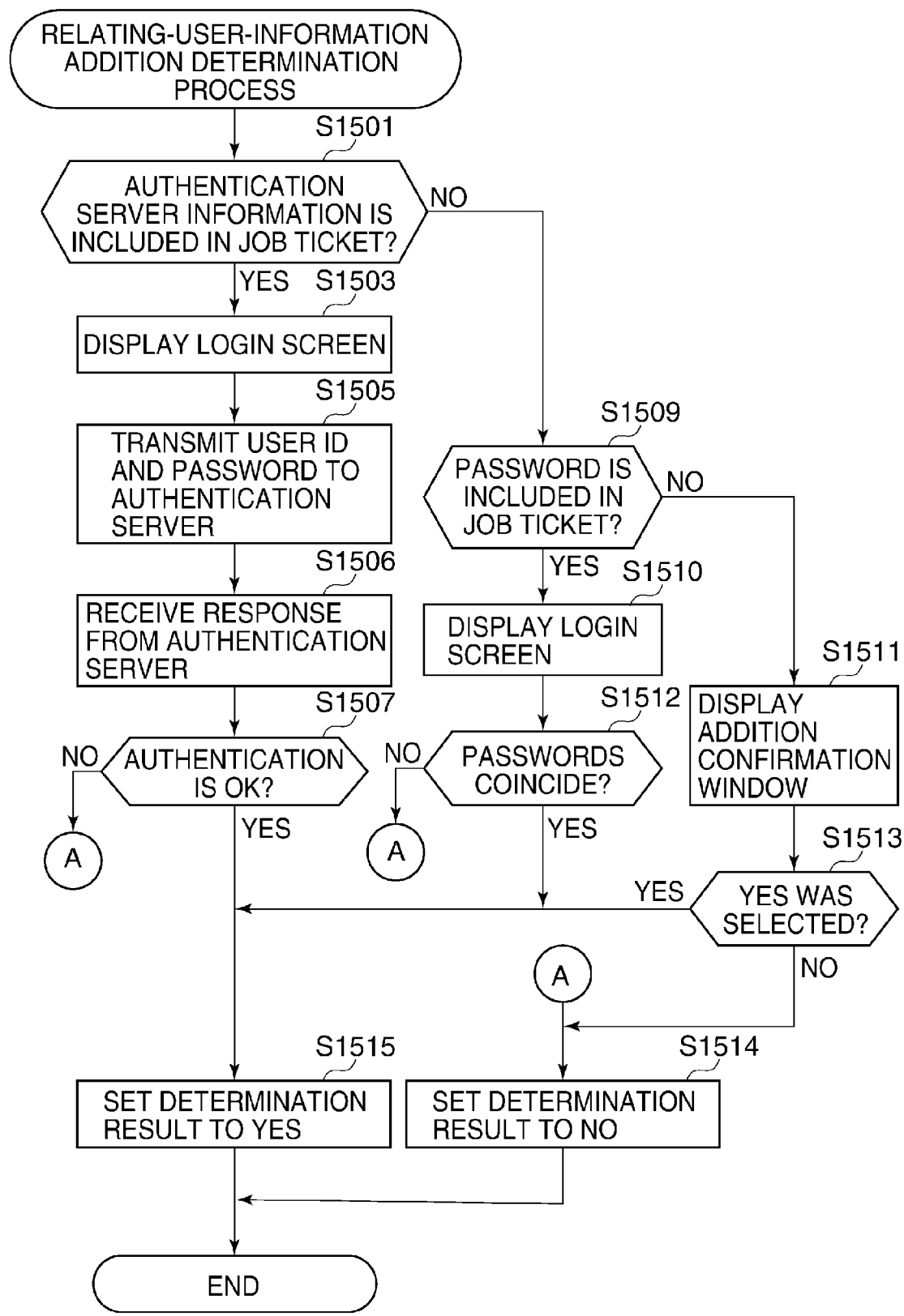
FIG. 20 is a flowchart showing procedures of a relating-user-information addition determination process executed in the step S1408 in FIG. 19.

FIG. 20 is a flowchart showing procedures of the relating-user-information addition determination process executed in the step S1408 in FIG. 19.

As shown in FIG. 20, it is first determined whether the job ticket includes authentication server information that shows an authentication server (step S1501).

As a result of the determination in the step S1501, when the authentication server information is included (YES in the step S1501), the login screen 1002 shown in FIG. 5B is displayed (step S1503), and a user ID and a password are inputted by the user.

Next, the user ID and the password inputted are transmitted to the authentication server (step S1505), and receive a response from the authentication server (step S1506).

Then, it is determined whether the response from the authentication server shows OK of the authentication (step S1507). As a result of the determination in the step S1507, when the response shows OK of the authentication (YES in the step S1507), the determination result is set to "YES" (step S1515), and this process finishes.

On the other hand, as a result of the determination in the step S1507, when the response does not show OK of the authentication (NO in the step S1507), the determination result is set to "NO" (step S1514), and this process finishes.

The description returns to the step S1501. As a result of the determination in the step S1501, when the authentication server information is not included (NO in the step S1501), it is determined whether a password is included in the job ticket (step S1509).

As a result of the determination in the step S1509, when a password is included (YES in the step S1509), the login screen 1002 shown in FIG. 5B is displayed (step S1510), and a password is inputted by the user. At this time, the input column for the user ID in the login screen 1002 is made invalid by masking the column, for example.

Next, it is determined whether the inputted password coincides with the password included in the job ticket (step S1512).

As a result of the determination in the step S1512, when the passwords coincide (YES in the step S1512), the process proceeds to the above-mentioned step S1515.

On the other hand, as a result of the determination in the step S1512, when the passwords do not coincide (NO in the step S1512), the process proceeds to the above-mentioned step S1514.

As a result of the determination in the above-mentioned step S1509, when a password is not included (NO in the step S1509), the addition confirmation window 2102 shown in FIG. 16B is displayed (step S1511). Then, it is determined whether "YES" was selected by holding up the IC card by the user (step S1513).

As a result of the determination in the step S1513, when "YES" was selected (YES in the step S1513), the process proceeds to the above-mentioned step S1515.

On the other hand, as a result of the determination in the step S1513, when "YES" was not selected (NO in the step S1513), the process proceeds to the above-mentioned step S1514.

As mentioned above, in the processes in FIG. 19 and FIG. 20, the image forming apparatus authenticates the user using the authentication server that determines whether the user is a genuine user before updating the contents stored in the IC card, and updates the contents stored in the IC card when the user is authenticated.

According to the processes in FIG. 19 and FIG. 20, it is verifiable about whether the relating user information about the login user allows charging by communicating with the authentication server with respect to the update of the relating user information.

As described above, since the image forming apparatus of the embodiment is requested to execute a print job according to a print protocol of an external apparatus, and charges to a chargeable user who instructed to execute the print job (step S907, step S411) when it is determined that job information for executing the print job does not allow charging (NO in the step S502, YES in the step S510), it becomes possible to flexibly cope with charging in various print protocols.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-009397, filed Jan. 22, 2014, which is hereby incorporated by reference herein in its entirety.

What is claimed is:

1. A printing apparatus comprising:
an interface which receives print data from an external device;
an user interface;
a memory storing instructions; and
one or more processors which executes the instructions and causes a printing apparatus to function as:
an acquiring unit configured to acquire user information corresponding to the received print data; and
a printing control unit configured to control a printing of a print data,
wherein the printing control unit performs a printing of the print data corresponding to the acquired user information without receiving a print instruction via the user interface in a case where the user information acquired by the acquiring unit is user information which is stored in a storage device, and performs the printing of the printing of the print data corresponding to the acquired user information based on a print instruction received via the user interface in a case where the user information acquired by the acquiring unit is user information which is not stored in the storage device.

2. The printing apparatus according to claim 1,
wherein the one or more processors further executes the instructions and causes a printing apparatus to function as
a first determination unit configured to determine, in a case where the user information acquired by the acquiring unit is the user information which is not stored in the storage device, whether or not a storage setting for storing the print data is set on the printing apparatus.

3. The printing apparatus according to claim 2,
wherein the one or more processors further executes the instructions and causes a printing apparatus to function as
a storage control unit configured to control the storage device to store the print data corresponding to the acquired user information in accordance with that the storage setting is set on the printing apparatus.

4. The printing apparatus according to claim 1,
wherein the one or more processors further executes the instructions and causes a printing apparatus to function as
a second determination unit configured to determine whether or not the user information acquired by the acquiring unit is stored in the storage device.

5. The printing apparatus according to claim 1,
wherein the one or more processors further executes the instructions and causes a printing apparatus to function as
a display control unit configured to display, on a display device, a list including the received print data and the user information corresponding to the received print data.

6. A control method for controlling a printing apparatus having a user interface, the control method comprising:
acquiring user information corresponding to the received print data; and
performing a printing of the print data corresponding to the acquired user information without receiving a print instruction via the user interface in a case where the acquired user information is user information stored in a storage device, and performing the printing of the printing of the print data corresponding to the acquired user information based on a print instruction received via the user interface in a case where the acquired user information is user information which is not stored in the storage device.

7. The method according to claim 6, further comprising:
determining, in a case where the acquired user information is the user information which is not stored in the storage device, whether or not a storage setting for storing the print data is set on the printing apparatus.

8. The method according to claim 7, further comprising:
controlling the storage device to store the print data corresponding to the acquired user information in accordance with that the storage setting is set on the printing apparatus.

9. The method according to claim 6, further comprising:
determining whether or not the acquired user information is stored in the storage device.

10. The method according to claim 6, further comprising:
displaying, on a display device, a list including the received print data and the user information corresponding to the received print data.

* * * * *